US012306690B2

(12) United States Patent
Yang et al.

(10) Patent No.: US 12,306,690 B2
(45) Date of Patent: May 20, 2025

(54) ELECTRONIC DEVICE FOR REDUCING POWER CONSUMPTION RELATED TO DISTANCE MEASUREMENT AND OPERATING METHOD THEREOF

(71) Applicant: SAMSUNG ELECTRONICS CO., LTD., Suwon-si (KR)

(72) Inventors: Yi Yang, Suwon-si (KR); Moonseok Kang, Suwon-si (KR); Hyunchul Kim, Suwon-si (KR); Muyeol Lee, Suwon-si (KR); Sehwan Choi, Suwon-si (KR); Sukgi Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 17/966,410

(22) Filed: Oct. 14, 2022

(65) Prior Publication Data
US 2023/0052144 A1 Feb. 16, 2023

Related U.S. Application Data

(63) Continuation of application No. PCT/KR2021/004059, filed on Apr. 1, 2021.

(30) Foreign Application Priority Data

Apr. 16, 2020 (KR) .......................... 10-2020-0045891

(51) Int. Cl.
*G06F 1/3209* (2019.01)
*G06F 1/3296* (2019.01)

(52) U.S. Cl.
CPC .......... *G06F 1/3209* (2013.01); *G06F 1/3296* (2013.01)

(58) Field of Classification Search
CPC .............. G06F 1/3209; G06F 1/3296; H04B 2201/71634; H04M 1/72415;
(Continued)

(56) References Cited

U.S. PATENT DOCUMENTS

| 9,942,849 B1 * | 4/2018 | Hariharan ......... H04W 52/0229 |
| 2003/0174048 A1 | 9/2003 | McCorkle |

(Continued)

FOREIGN PATENT DOCUMENTS

| KR | 10-2016-0100147 A | 8/2016 |
| KR | 10-2019-0038152 A | 4/2019 |

OTHER PUBLICATIONS

Communication issued Aug. 10, 2023 by the European Patent Office in counterpart European Patent Application No. 21789376.7.

*Primary Examiner* — Jaweed A Abbaszadeh
*Assistant Examiner* — Brynne J. Corcoran
(74) *Attorney, Agent, or Firm* — Sughrue Mion, PLLC

(57) ABSTRACT

According to various example embodiments of the present invention, an electronic device may comprise: a sensor module; a first communication circuit supporting a first communication scheme; a low-power processor; and a processor operatively connected to the sensor module, the first communication circuit, and the low-power processor, wherein the first communication circuit transmits a request signal related to a state of the electronic device to the low-power processor on the basis of distance measurement-related information provided from the processor, receives information related to the state of the electronic device from the low-power processor in response to the request signal, and measures a distance to an external electronic device on the basis of the information related to the state of the electronic device. Other embodiments may also be possible.

19 Claims, 19 Drawing Sheets

(58) Field of Classification Search
CPC ............. H04W 52/0225; H04W 76/27; H04W 52/0254; H04W 52/0258; H04W 52/0245; H04W 52/028; H04W 64/00; H04W 84/18; H04W 52/0261; H04W 88/00; G01S 11/02; G01S 13/0209; G01S 13/08; Y02D 30/70

See application file for complete search history.

(56) References Cited

U.S. PATENT DOCUMENTS

| | | |
|---|---|---|
| 2014/0285319 A1 | 9/2014 | Khan et al. |
| 2015/0095533 A1* | 4/2015 | Valavi ................... G06F 1/3209 710/106 |
| 2015/0291127 A1* | 10/2015 | Ghabra ............. G07C 9/00309 701/2 |
| 2016/0239347 A1 | 8/2016 | Lee et al. |
| 2017/0195957 A1* | 7/2017 | Debates ............ H04W 52/0254 |
| 2019/0135229 A1 | 5/2019 | Ledvina et al. |
| 2019/0278354 A1* | 9/2019 | Alameh .................. G06F 3/013 |
| 2020/0106877 A1 | 4/2020 | Ledvina et al. |
| 2021/0170991 A1* | 6/2021 | Parthasarathi .......... H04W 4/48 |

* cited by examiner

ELECTRONIC DEVICE FOR REDUCING POWER CONSUMPTION RELATED TO DISTANCE MEASUREMENT AND OPERATING METHOD THEREOF

CROSS REFERENCE TO RELATED APPLICATION

This application is a Bypass Continuation Application of International Application No. PCT/KR2021/004059 filed on Apr. 1, 2021, which claims priority to Korean Patent Application Number 10-2020-0045891 filed on Apr. 16, 2020, the entire content of which are incorporated herein for all purposes by this reference.

BACKGROUND

1. Field

Various embodiments of the disclosure relate to a device and method for reducing power consumption related to distance measurement in an electronic device.

2. Description of Related Art

As an electronic device (e.g., an electronic device for communication) is commonly used in daily life with the development of wireless communication technology, user demands are increasing. Various types of wireless communication technologies may be used to meet user requirements. For example, the wireless communication technology may include at least one of ultrawide-band (UWB) communication, wireless fidelity (Wi-Fi) communication, long-term evolution (LTE) communication, 5G communication (or new radio (NR) communication), or Bluetooth communication.

SUMMARY

An electronic device may provide a keyless access service based on a distance to an external electronic device measured using wireless communication. When the distance between the electronic device and the external electronic device (e.g., a door device) satisfies a designated condition (e.g., within a default distance), the keyless access service may automatically unlock the external electronic device (e.g., a door device) without a user's additional operation (e.g., an authentication operation).

When the electronic device provides the keyless access service, the electronic device may continuously (or periodically) measure the distance to the external electronic device using wireless communication (e.g., UWB communication). For example, when using a UWB communication scheme, the electronic device may measure the distance to the external electronic device (e.g., a door device) by performing a periodic ranging procedure.

When the electronic device performs an operation of measuring the distance to the external electronic device through wireless communication, the operating state of the electronic device may not be considered. Accordingly, the electronic device may perform the unnecessary operation of measuring the distance so that unnecessary power consumption may occur. For example, since the electronic device does not move when the user of the electronic device stays at a specific point, the distance between the electronic device and the external electronic device may remain unchanged. However, since the electronic device performs the distance measurement operation at the same period (or interval) even when the electronic device does not move, unnecessary power consumption may occur.

Various example embodiments of the disclosure provide an apparatus and method for performing a distance measurement operation in an electronic device based on information related to an operating state of the electronic device.

According to an aspect of the disclosure, there is provided an electronic device including: one or more sensors; a first communication circuit configured to support a first communication scheme; a first processor; and a second processor configured to be operatively connected to the one or more sensors, the first communication circuit, and the first processor, wherein the first communication circuit is configured to: transmit a request signal related to a state of the electronic device to the first processor based on first information related to a distance measurement provided by the second processor; receive second information related to the state of the electronic device from the first processor based on the request signal; and measure a distance to an external electronic device based on the second information related to the state of the electronic device.

The first communication circuit may be further configured to: identify a first interval as a distance measurement interval based on the second information related to the state of the electronic device; and transmit a distance measurement signal to the external electronic device based on the first interval.

The first communication circuit may be further configured to: based on a change in the state of the electronic device being received from the first processor, identify a second interval different from the first interval as the distance measurement interval; and transmit the distance measurement signal to the external electronic device based on the second interval.

The first processor may be configured to: identify sensor data detected through the one or more sensors based on the request signal related to the state of the electronic device; identify the state of the electronic device based on the sensor data; and transmit the second information related to the state of the electronic device to the first communication circuit based on a results of identifying the state.

The one or more sensors may include at least one of an accelerometer sensor, a gyro sensor, a barometer sensor, or a magnetic sensor.

The electronic device may further include a second communication circuit configured to support a second communication scheme, wherein the processor may be configured to: identify the distance to the external electronic device through the second communication circuit; and in case that the distance to the external electronic device satisfies a first reference value, transmit the first information to the first communication circuit.

The first communication scheme may include an ultrawideband (UWB) communication scheme, and the second communication scheme may include one of Bluetooth, Bluetooth low energy (BLE), wireless fidelity (Wi-Fi), a global navigation satellite system (GNSS), or a cellular (e.g., long-term evolution (LTE) or new radio (NR)) communication scheme.

The processor may be configured to be switched to a sleep state, an idle state, or a low-power state while the first communication circuits measures the distance to the external electronic device.

The first communication circuit may be further configured to transmit a distance measurement-related signal including the second information related to the state of the electronic device to the external electronic device.

The first processor may be configured to operate at a lower power than the second processor.

According to another aspect of the disclosure, there is provided a method of operating an electronic device, the method including: transmitting, by a first communication circuit supporting a first communication scheme, a request signal related to a state of the electronic device to a first processor of the electronic device; receiving information related to the state of the electronic device from the first processor based on the request signal; identifying a first interval, as a distance measurement interval, based on the information related to the state of the electronic device; and measuring a distance to an external electronic device based on the first interval.

The method further including identifying, based on a change in the state of the electronic device being received from the first processor, a second interval different from the first interval, as the distance measurement interval; and measuring the distance to the external electronic device based on the second interval.

The receiving of the information related to the state of the electronic device may include: identifying, by the first processor, sensor data detected through one or more sensors of the electronic device based on the request signal related to the state of the electronic device; identifying, by the first processor, the state of the electronic device based on the sensor data; and transmitting, by the first processor, the information related to the state of the electronic device based on a results of identifying the state.

The method further including identifying, by a second processor of the electronic device, the distance to the external electronic device through a second communication circuit supporting a second communication scheme; and transmitting distance measurement-related information to the first communication circuit in case that the distance to the external electronic device satisfies a designated first reference, wherein the transmitting to the first processor may include transmitting, by the first communication circuit, the request signal related to the state of the electronic device to the first processor based on the distance measurement-related information provided from the second processor.

The processor may be configured to be switched to a sleep state, an idle state, or a low-power state after transmitting the distance measurement-related information to the first communication circuit.

The first communication scheme may include an ultra-wideband (UWB) communication scheme, and the second communication scheme may include one of Bluetooth, Bluetooth low energy (BLE), wireless fidelity (Wi-Fi), a global navigation satellite system (GNSS), or a cellular (e.g., long-term evolution (LTE) or new radio (NR)) communication scheme.

According to another aspect of the disclosure, there is provided an electronic device including: one or more memories configured to store one or more instructions; and one or more processors configured to execute the one or more instructions to: receive sensor data from one or more sensors corresponding to the electronic device; identifying a state of the electronic device based on the sensor data; identifying a first interval, as a distance measurement interval, based on the identified state of the electronic device; measure a distance to an external electronic device based on the first interval.

The one or more processors may be further configured to identify whether the electronic device is in a state of movement.

The electronic device may further include the one or more sensors.

The one or more processor may be further configured to identify, based on a change in the state of the electronic device, a second interval different from the first interval as the distance measurement interval, and measure the distance to the external electronic device based on the second interval.

The one or more processors may include: a first processor configured to receive the sensor data from the one or more sensors; and a second processor configured to control the measurement of the distance to the external electronic device based on the state of the electronic device, wherein the first processor is configured to operate at a lower power than the second processor.

According to various example embodiments of the disclosure, an electronic device may reduce power consumption due to distance measurement by adjusting a distance measurement interval (e.g., a ranging interval) based on information related to an operating state of the electronic device.

According to various example embodiments, a first communication circuit (e.g., UWB communication circuit) of an electronic device may directly acquire information related to the operating state of the electronic device from a low-power processor (e.g., a sensor hub processor), and thus power consumption may be reduced by limiting the driving of a processor (e.g., application processor) related to the acquisition of the information related to the operating state of the electronic device.

DETAILED DESCRIPTION

Hereinafter, various example embodiments will be described with reference to the accompanying drawings.

Figure 1:
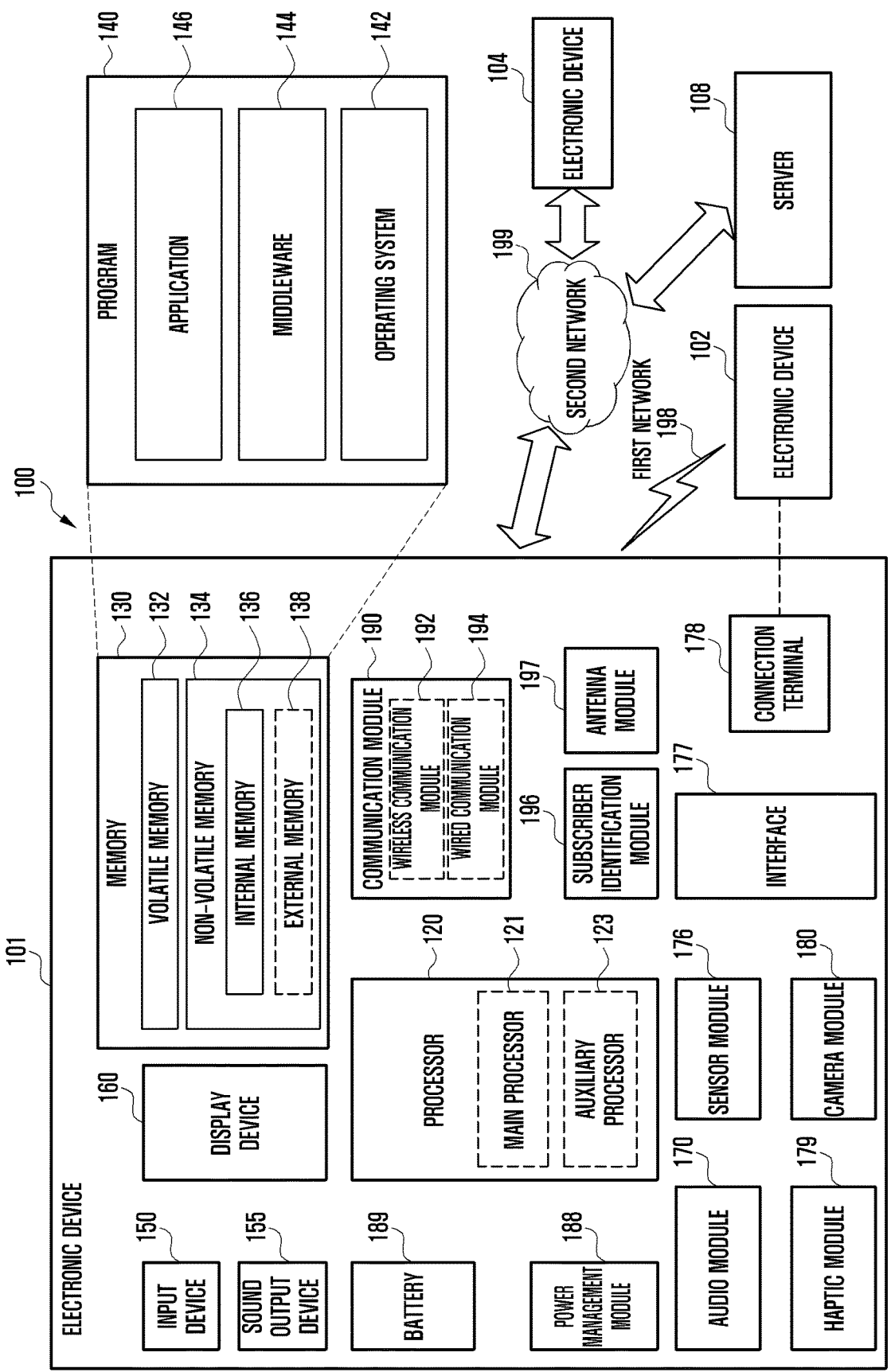
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term may not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
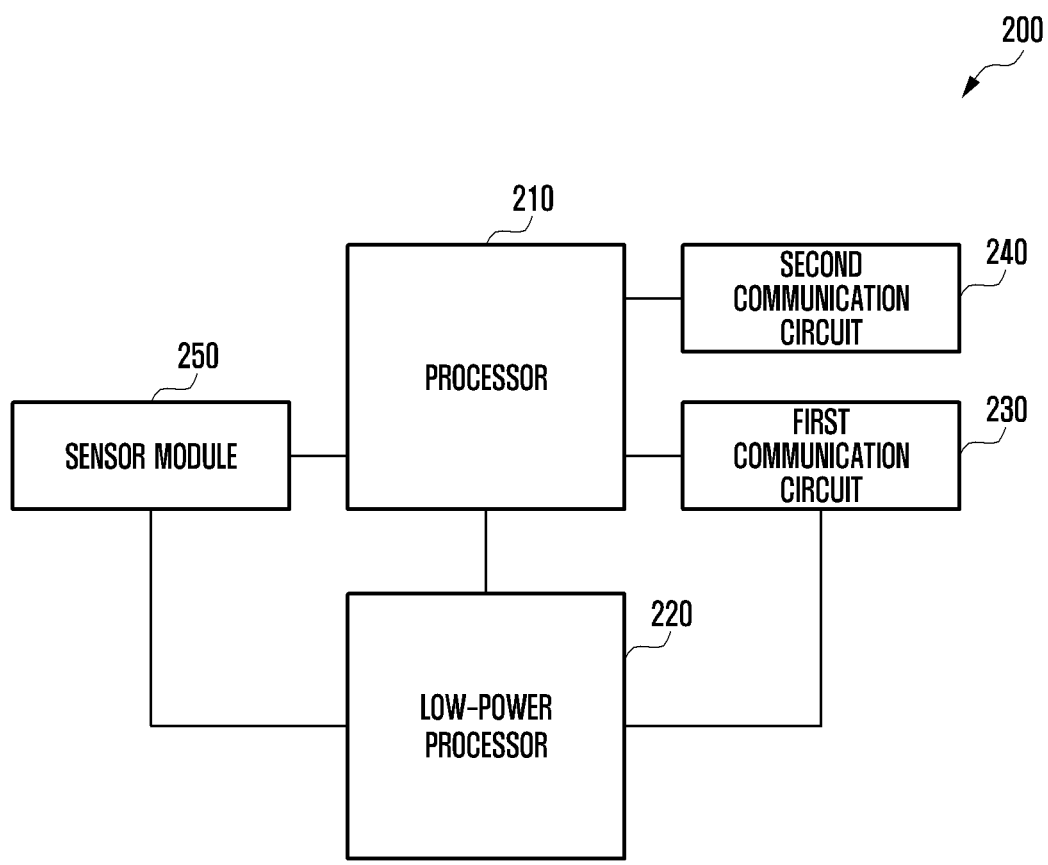
FIG. 2 is a block diagram illustrating an electronic device for adjusting a distance measurement interval according to various example embodiments.

FIG. 2 is a block diagram illustrating an electronic device 200 for adjusting a distance measurement interval according to various example embodiments. For example, the electronic device 200 of FIG. 2 may be at least partially similar to the electronic device 101 of FIG. 1. However, the disclosure is not limited thereto, and as such, according to another example embodiment, the electronic device 200 may include one or more components different from the electronic device 101.

Referring to FIG. 2, the electronic device 200 may include a processor 210, a low-power processor 220, a first communication circuit 230, a second communication circuit 240, and/or a sensor module 250. According to an example embodiment, the processor 210 may be substantially the same as the main processor 121 (e.g., an application processor) of FIG. 1, or may be included in the main processor 121. According to an example embodiment, the low-power processor 220 may be substantially the same as the auxiliary processor 123 (e.g., a sensor hub processor) of FIG. 1 or may be included in the auxiliary processor 123. According to an example embodiment, the low-power processor 220 may consume less power than then main processor 121. For example, the low-power processor 220 may consume less power than then main processor 121 during a normal operation according to an example embodiment. According to an example embodiment, the first communication circuit 230 and the second communication circuit 240 may be same as or substantially same as the wireless communication module 192 of FIG. 1, or may be included in the wireless communication module 192. According to an example embodiment, the sensor module 250 may be same as or substantially same as the sensor module 176 of FIG. 1, or may be included in the sensor module 176. However, the disclosure is not limited thereto, and as such, according to another example embodiment, the sensor module 250 may include one or more components different from or in additional to the sensor module 176 of FIG. 1.

According to various example embodiments, the processor 210 may control the first communication circuit 230 to perform distance measurement. According to an example embodiment, when an application program (e.g., the application 146 of FIG. 1) related to distance measurement is executed, the processor 210 may determine to start distance measurement using the first communication circuit 230. According to an example embodiment, when a distance between the electronic device 200 and an external electronic device (e.g., the electronic device 102 of FIG. 1) identified through the second communication circuit 240 is within a designated first distance, the processor 210 may determine to start distance measurement using the first communication circuit 230. In an example embodiment, when the strength (e.g., a received signal strength indicator (RSSI)) of a signal transmitted and received to and from the external electronic device through the second communication circuit 240 is greater than a designated threshold value, the processor 210 may determine to start distance measurement using the first communication circuit 230. According to an example embodiment, the processor 210 may monitor a change in the strength (e.g., RSSI) of the signal transmitted and received to and from the external electronic device through the second communication circuit 240. For example, the processor 210 may determine to start distance measurement using the first communication circuit 230 when an increase in the signal strength is recognized based on the monitoring result.

According to an example embodiment, the processor 210 may transmit a signal related to the start of distance measurement to the first communication circuit 230 based on the determination to start distance measurement. For example, when the first communication circuit 230 is in an enabled state, the processor 210 may transmit information related to transition to an enabled state to the first communication circuit 230 based on the determination to start distance measurement. When the first communication circuit 230 is switched to the enabled state, the processor 210 may transmit the signal related to the start of distance measurement to the first communication circuit 230. For example, the signal related to the start of distance measurement may include configuration information instructing the start of distance measurement and/or configuration information related to distance measurement. For example, the configuration information related to distance measurement may include a state of the electronic device 200 required by the application program and/or a distance measurement interval related to the state of the electronic device 200.

According to an example embodiment, when the application program (e.g., the application 146 of FIG. 1) related to distance measurement is executed, the processor 210 may transmit the configuration information related to distance measurement to the first communication circuit 230. When a distance measurement function of the application program related to distance measurement is executed, the processor 210 may transmit the information instructing the start of distance measurement to the first communication circuit 230.

According to an example embodiment, the processor 210 may transmit the signal related to the start of distance measurement to the first communication circuit 230, and may then be switched to a sleep state, an idle state, or a low-power state.

According to an example embodiment, when the execution of the application program related to distance measurement is completed, the processor 210 may determine to terminate distance measurement using the first communication circuit 230. According to an example embodiment, when the distance between the electronic device 200 and the external electronic device which is identified through the second communication circuit 240 exceeds the designated first distance, the processor 210 may determine to terminate distance measurement using the first communication circuit 230. In an example embodiment, when the strength (e.g., RSSI) of the signal transmitted and received to and from the external electronic device through the second communication circuit 240 is smaller than or equal to the designated threshold value, the processor 210 may determine that distance measurement using the first communication circuit 230 is terminated. According to an example embodiment, when a decrease in the strength (e.g., RSSI) of the signal transmitted and received to and from the external electronic device through the second communication circuit 240 is recognized, the processor 210 may determine to terminate distance measurement using the first communication circuit 230. According to an example embodiment, the processor 210 may transmit, to the first communication circuit 230, a signal related to the end of distance measurement based on the determination to terminate distance measurement.

According to various example embodiments, the low-power processor 220 may be operated independently of the processor 210 or together with the processor 210. According to an example embodiment, the low-power processor 220 may receive the information related to the state of the electronic device 200 required by the first communication circuit 230 from the first communication circuit 230. According to an example embodiment, the low-power processor 220 may acquire the state of the electronic device 200 based on sensor data acquired through the sensor module 250. For example, when it is determined that the position of the electronic device 200 is changed slowly based on the sensor data acquired through the sensor module 250, the low-power processor 220 may determine that the state of the electronic device 200 is "walking". For example, when the change in the position is not detected based on the sensor data acquired through the sensor module 250, the low-power processor 220 may determine that the state of the electronic device 200 is "not moving". For example, when it is determined that the change in the position of the electronic device 200 is relatively fast based on the sensor data acquired through the sensor module 250, the low-power processor 220 may determine that the state of the electronic device 200 is "running". For example, when the state of the electronic device 200 is the state of the electronic device 200 required by the first communication circuit 230 based on the sensor data acquired through the sensor module 250, the low-power processor 220 may transmit information related to the state of the electronic device 200 to the first communication circuit 230. For example, when the state of the electronic device 200 required by the first communication circuit 230 includes "walking", "not moving", and/or "running", the low-power processor 220 may transmit, to the first communication circuit 230, the state such as "walking", "not moving", and "running" identified through the sensor data. For example, the state of the electronic device 200 required by the first communication circuit 230 may include the state of the electronic device 200 required by a plurality of application programs. For example, when "walking" and/or "not moving" is required by the first application program and "walking" and/or "running" is required by the second application program, the low-power processor 220 may determine that the state of the electronic device 200 required by the first communication circuit 230 includes "walking", "not moving", and/or "running". For example, the state of the electronic device 200 may include a type of movement of the electronic device 200 (e.g., not moving, walking, running, or moving by car).

According to an example embodiment, the low-power processor 220 may use relatively low power than that of the processor 210. For example, according to an example embodiment, the low-power processor 220 may use lower power than the processor 210.

According to various example embodiments, the first communication circuit 230 may support a first communication scheme. According to an example embodiment, the first communication circuit 230 may transmit and/or receive data to/from the external electronic device through the first communication scheme. For example, the first communication scheme may include a (ultra-wide band) UWB communication scheme. According to an example embodiment, the first communication circuit 230 may perform (or start) distance measurement based on the distance measurement-related signal received from the processor 210. For example, the first communication circuit 230 may establish a communication channel with the external electronic device (e.g., the electronic device 102 of FIG. 1) based on the signal related to the start of distance measurement. The first communication circuit 230 may transmit and/or receive data related to distance measurement between the electronic device 200 and the external electronic device through the communication channel with the external electronic device. For example, the first communication circuit 230 may transmit and/or receive the data related to distance measurement to and/or from the external electronic device based on a distance measurement interval corresponding to the state of the electronic device 200. According to an example embodiment, the first communication circuit 230 may end distance measurement based on the signal related to the end of distance measurement received from the processor 210.

According to various example embodiments, the first communication circuit 230 may acquire information related to the state of the electronic device 200 from the low-power processor 220. According to an example embodiment, when the first communication circuit 230 determines to start distance measurement with the external electronic device (e.g., the electronic device 102 of FIG. 1) based on the signal related to the start of distance measurement received from the processor 210, the first communication circuit 230 may transmit a request signal related to the state of the electronic device 200 to the low-power processor 220. The first communication circuit 230 may receive the information related to the state of the electronic device 200 from the low-power processor 220 in response to the request signal related to the state of the electronic device 200. According to an example embodiment, the first communication circuit 230 may receive the information related to the state of the electronic device 200 from the low-power processor 220 based on the request signal related to the state of the electronic device 200. For example, when the request signal related to the state of the electronic device 200 is received from the first communication circuit 230, the low-power processor 220 may transmit the information related to the state of the electronic device 200 to the first communication circuit 230. For example, when a change in the state of the electronic device 200 is detected based on the request signal received from the first communication circuit 230, the low-power processor 220 may transmit the information related to the state of the electronic device 200 to the first communication circuit 230. For example, the low-power processor 220 may periodically transmit the information related to the state of the electronic device 200 to the first communication circuit 230 based on the request signal received from the first communication circuit 230. For example, the information related to the state of the electronic device 200 may include the movement type of the electronic device 200 determined by the low-power processor 220 or at least one sensor data for determining the movement type of the electronic device 200. For example, the first communication circuit 230 and the low-power processor 220 may be connected through a universal asynchronous receiver/transmitter (UART) communication scheme, a serial peripheral interface (SPI) communication scheme, or an inter integrated circuit (I2C) communication scheme. For example, a period in which the low-power processor 220 transmits the information related to the state of the electronic device 200 may be determined by the first communication circuit 230 based on the application program executed by the processor 210 or the state of the electronic device 200.

According to an example embodiment, the first communication circuit 230 may transmit the information related to the state of the electronic device 200 required for distance measurement to the low-power processor 220 based on the configuration information related to distance measurement received from the processor 210. When the first communication circuit 230 determines to start distance measurement with the external electronic device (e.g., the electronic device 102 of FIG. 1) based on the information instructing the start of distance measurement received from the processor 210, the first communication circuit 230 may transmit the request signal related to the state of the electronic device 200 to the low-power processor 220. The first communication circuit 230 may receive the information related to the state of the electronic device 200 from the low-power processor 220 in response to the request signal related to the state of the electronic device 200.

According to various example embodiments, the first communication circuit 230 may configure the distance measurement interval based on the state of the electronic device 200. According to an example embodiment, the first communication circuit 230 may differently configure the distance measurement interval for measuring the distance to the external electronic device based on the state of the electronic device 200. For example, the first communication circuit 230 may configure an interval for measuring the distance to the external electronic device (e.g., the electronic device 102 of FIG. 1) based on the distance measurement interval related to the state of the electronic device 200 received from the low-power processor 220 and the state of the electronic device 200 received from the processor 210.

According to an example embodiment, when the state of the electronic device 200 received from the low-power processor 220 is "walking", the first communication circuit 230 may configure the distance measurement interval as a first interval. For example, the distance measurement interval may be configured as the first interval when the state of "walking" of the electronic device 200 is maintained for a designated first time period. For example, the first interval may include a distance measurement interval that is the same as or different from a default distance measurement interval.

According to an example embodiment, when the state of the electronic device 200 received from the low-power processor 220 is "not moving", the first communication circuit 230 may configure the distance measurement interval as the default distance measurement interval or a second interval relatively longer than the first interval. For example, the distance measurement interval may be configured as the second interval when the state of "not moving" of the electronic device 200 is maintained for a designated second time period.

According to an example embodiment, when the state of the electronic device 200 received from the low-power processor 220 is "running", the first communication circuit 230 may configure the distance measurement interval as the default distance measurement interval or a third interval relatively shorter than the first interval. For example, when the state of "running" of the electronic device 200 is maintained for a designated third time period, the distance measurement interval may be configured as the third interval. For example, at least one of the designated first time period, second time period, or third time period may include the same time range or different time ranges.

According to an example embodiment, the first communication circuit 230 may differently configure the interval for measuring the distance to the external electronic device based on the state of the electronic device 200, thereby increasing accuracy of distance measurement and reducing resource consumption. For example, the first communication circuit 230 may configure the distance measurement interval as the third interval based on the state of "running" of the electronic device 200, thereby rapidly detecting a change in the distance between the electronic device 200 and the external electronic device. For example, the first communication circuit 230 may configure the distance measurement interval as the first interval or the second interval based on the state of "walking" or "not moving" of the electronic device 200, thereby reducing communication resources and/or power consumption required for data generation or data processing for distance measurement.

According to an example embodiment, when the configuration information related to distance measurement is not received from the processor 210 or when the state of the electronic device 200 required by the application program executed in the processor 210 does not exist, the first communication circuit 230 may configure the distance measurement interval as a designated default distance measurement interval.

According to various example embodiments, the first communication circuit 230 may configure a period (or an interval) for receiving the state of the electronic device 200 from the low-power processor 220. According to an example embodiment, the first communication circuit 230 may configure a period for receiving the state of the electronic device 200 from the low-power processor 220 based on the application program executed in the processor 210 and/or the state of the electronic device 200. For example, when the state of the electronic device 200 is "moving by car", the first communication circuit 230 may configure the period for receiving the state of the electronic device 200 to be relatively short. For example, when the state of the electronic device 200 is "walking" and the electronic device 200 provides a virtual reality function, the first communication circuit 230 may configure the period for receiving the state of the electronic device 200 to be relatively long. For example, the period for receiving the state of the electronic device 200 may be configured to be relatively short when the movement speed of the electronic device 200 is relatively fast, and configured to be relatively long when the movement speed thereof is relatively slow. For example, the period for receiving the state of the electronic device 200 may be transmitted to the low-power processor 220 through the request signal related to the state of the electronic device 200 or a separate signal.

According to various example embodiments, the first communication circuit 230 may measure the distance to the external electronic device based on the distance measurement interval configured based on the state of the electronic device 200. According to an example embodiment, for the purpose of distance measurement, the first communication circuit 230 may measure the distance between the electronic device 200 and the external electronic device based on a difference between a time point when a signal (e.g., a ranging signal) is transmitted to the external electronic device (e.g., the external electronic device 102 of FIG. 1) and a time point when the signal (e.g., the ranging signal) is received from the external electronic device.

According to an example embodiment, the first communication circuit 230 may transmit a distance measurement start message to the external electronic device through the communication channel established with the external electronic device. The first communication circuit 230 may receive a response message to the distance measurement start message from the external electronic device. For example, the response message may include time information (e.g., a time value) related to a processing delay required for the external electronic device to process (e.g., generate the response message) the distance measurement start message. For example, the first communication circuit 230 may estimate the distance between the electronic device 200 and the external electronic device based on a transmission time point of the distance measurement start message, a reception time point of the response message, and the time information related to the processing delay of the external electronic device.

According to an example embodiment, the first communication circuit 230 may transmit a first message related to distance measurement to the external electronic device through the communication channel established with the external electronic device. The first communication circuit 230 may receive a response message to the first message from the external electronic device. When a predetermined time has elapsed after receiving the response message, the first communication circuit 230 may transmit a second message related to distance measurement to the external electronic device. For example, the predetermined time may be configured based on the time information related to the processing delay of the external electronic device. For example, the first communication circuit 230 may estimate the distance between the electronic device 200 and the external electronic device based on a transmission time point of the first message, a reception time point of the response message, and the time information related to the processing delay of the external electronic device. For example, the external electronic device may estimate the distance between the electronic device 200 and the external electronic device based on a transmission time point of the response message, a reception time point of the second message, and a predetermined time (e.g., the time information related to the processing delay of the external electronic device). For example, when distance information is received from the external electronic device, the first communication circuit 230 may determine the distance between the electronic device 200 and the external electronic device based on distance information estimated by the first communication circuit 230 and the distance information received from the external electronic device.

According to various example embodiments, the first communication circuit 230 may acquire sensor data from the low-power processor 220. According to an example embodiment, when it is determined to start distance measurement with the external electronic device (e.g., the electronic device 120 of FIG. 1), the first communication circuit 230 may transmit a request signal related to sensor data for position estimation of the electronic device 200 to the low-power processor 220. The first communication circuit 230 may receive the sensor data from the low-power processor 220 based on the request signal related to the sensor data. For example, when the request signal related to the sensor data is received from the first communication circuit 230, the low-power processor 220 may transmit the sensor data detected by the sensor module 250 to the first communication circuit 230. For example, the low-power processor 220 may periodically transmit the sensor data detected by the sensor module 250 to the first communication circuit 230 based on the request signal received from the first communication circuit 230. For example, the sensor data may include sensor data (raw data) detected through at least one sensor of a motion sensor (e.g., an accelerometer sensor and/or a gyro sensor) or a barometer sensor. According to an example embodiment, the first communication circuit 230 may add the sensor data received from the low-power processor 220 to the signal (e.g., the ranging signal) and may transmit the signal to the external electronic device in order to measure the distance to the external electronic device. For example, the external electronic device may estimate or correct the position (e.g., height) of the electronic device 200 based on the sensor data (e.g., barometer information) provided from the electronic device 200 (e.g., the first communication circuit 230).

According to various example embodiments, the first communication circuit 230 may provide the sensor data to the processor 210. According to an example embodiment, the first communication circuit 230 may transmit a request signal related to the sensor data to the low-power processor 220 based on a request from the processor 210. The first communication circuit 230 may receive the sensor data from the low-power processor 220 based on the request signal related to the sensor data. The sensor data may be transmitted to the processor 210 together with the distance measurement result of the first communication circuit 230. For example, the sensor data may include at least one sensor data required by the application program executed in the processor 210.

According to various example embodiments, the second communication circuit 240 may support a second communication scheme different from the first communication scheme. According to an example embodiment, the second communication circuit 240 may transmit and/or receive data to/from the external electronic device through the second communication scheme. For example, the second communication scheme may include at least one of Bluetooth, Bluetooth low energy (BLE), wireless fidelity (Wi-Fi), global navigation satellite system (GNSS), or a cellular (e.g., long-term evolution (LTE) or new radio (NR)) communication scheme. According to an example embodiment, the second communication scheme may operate with relatively low power or may enable a relatively long distance transmission compared to the first communication scheme. For example, the second communication circuit 240 supporting the second communication scheme may consume less power than the first communication circuit 230 supporting the first communication scheme. Accordingly, the enable time of the second communication circuit 240 may be longer than that of the first communication circuit 230. For example, generally, the second communication circuit 240 may always maintain an enabled state. For example, the first communication circuit 230 may be enabled based on a request from the processor 210 for a specific purpose (e.g., distance measurement or data communication).

According to various example embodiments, the sensor module 250 may detect an operating state (e.g., movement) of the electronic device 200 or an external environmental state (e.g., a user state). According to an example embodiment, the sensor module 250 may include at least one of an accelerometer sensor, a gyro sensor, a barometer sensor, and a magnetic sensor. According to an example embodiment, when the sensor value fluctuates periodically or beyond a designated range, the sensor module 250 may transmit the measured sensor data to the low-power processor 220.

According to various example embodiments, the state of the electronic device 200 may be determined by the first communication circuit 230. According to an example embodiment, the low-power processor 220 may transmit the sensor data acquired through the sensor module 250 to the first communication circuit 230 based on the information related to the state of the electronic device 200 received from the first communication circuit 230. For example, the low-power processor 220 may periodically transmit the sensor data related to the state of the electronic device 200 to the first communication circuit 230 based on a period determined by the first communication circuit 230. For example, the low-power processor 220 may transmit sensor data satisfying a designated condition from the sensor data acquired through the sensor module 250, to the first communication circuit 230. According to an example embodiment, the first communication circuit 230 may identify the state of the electronic device 200 based on the sensor data received from the low-power processor 220. For example, when the state of the electronic device 200 is the state of the electronic device 200 required by the application program, the first communication circuit 230 may configure the distance measurement interval based on the state of the electronic device 200.

According to various example embodiments, an electronic device (e.g., the electronic device 101 of FIG. 1 or the electronic device 200 of FIG. 2) may include a sensor module (e.g., the sensor module 176 of FIG. 1 or the sensor module 250 of FIG. 2), a first communication circuit (e.g., the wireless communication module 192 of FIG. 1 or the first communication circuit 230 of FIG. 2) supporting a first communication scheme, a low-power processor (e.g., the auxiliary processor 123 of FIG. 1 or the low-power processor 220 of FIG. 2), and a processor (e.g., the main processor 122 of FIG. 1 or the processor 210 of FIG. 2) configured to be operatively connected to the sensor module, the first communication circuit, and the low-power processor, wherein the first communication circuit may transmit a request signal related to a state of the electronic device to the low-power processor based on information related to distance measurement provided from the processor, may receive the information related to the state of the electronic device from the low-power processor in response to the request signal, and may measure a distance to an external electronic device based on the information related to the state of the electronic device.

According to various example embodiments, the first communication circuit may configure a distance measurement interval as a first interval based on the information related to the state of the electronic device, and may transmit a signal for distance measurement to the external electronic device based on the first interval.

According to various example embodiments, when information related to a change in the state of the electronic device is received from the low-power processor, the first communication circuit may configure the distance measurement distance as a second interval different from the first interval based on the information related to the change in the state of the electronic device, and may transmit the signal for distance measurement to the external electronic device based on the second interval.

According to various example embodiments, the low-power processor may identify sensor data detected through the sensor module based on the request signal related to the state of the electronic device, may identify the state of the electronic device based on the sensor data, and may transmit the information related to the state of the electronic device to the first communication circuit based on the identification result.

According to various example embodiments, the sensor module may include at least one of an accelerometer sensor, a gyro sensor, a barometer sensor, and a magnetic sensor.

According to various example embodiments, the electronic device may further include a second communication circuit (e.g., the wireless communication module 192 of FIG. 1 or the second communication circuit 240 of FIG. 2) configured to support a second communication scheme, wherein the processor may identify the distance to the external electronic device through the second communication circuit, and may transmit the information related to distance measurement to the first communication circuit when the distance to the external electronic device satisfies a designated first reference.

According to various example embodiments, the first communication scheme may support an ultra-wideband (UWB) communication scheme, and the second communication scheme may support one of Bluetooth, Bluetooth low energy (BLE), wireless fidelity (Wi-Fi), a global navigation satellite system (GNSS), or a cellular (e.g., long-term evolution (LTE) or new radio (NR)) communication scheme.

According to various example embodiments, the processor may be switched to a sleep state, an idle state, or a low-power state while the first communication circuit measures the distance to the external electronic device.

According to various example embodiments, the first communication circuit may transmit a distance measurement-related signal including the information related to the state of the electronic device to the external electronic device.

According to various example embodiments, the first communication circuit may transmit the information related to the state of the electronic device to the processor together with a distance measurement result with the external electronic device.

According to various example embodiments, an electronic device (e.g., the electronic device 101 of FIG. 1 or the electronic device 200 of FIG. 2) may include a sensor module (e.g., the sensor module 176 of FIG. 1 or the sensor module 250 of FIG. 2), a processor (e.g., the main processor 122 of FIG. 1), a low-power processor (e.g., the auxiliary processor 123 of FIG. 1 or the low-power processor 220 of FIG. 2), and a first communication circuit (e.g., the wireless communication module 192 of FIG. 1 or the first communication circuit 230 of FIG. 2) configured to be operatively connected to the processor and the low-power processor and to support a first communication scheme, wherein the first communication circuit may transmit a request signal including information related to sensor data required by the first communication circuit to the low-power processor based on distance measurement-related information provided from the processor, may receive at least one sensor data from the low-power processor in response to the request signal, may identify a state of the electronic device based on the at least one sensor data, and may measure a distance to an external electronic device based on the state of the electronic device.

According to various example embodiments, the first communication circuit may configure a distance measurement interval as a first interval based on the state of the electronic device, and may transmit a signal for distance measurement to the external electronic device based on the first interval.

According to various example embodiments, the first communication circuit may receive at least one other sensor data from the low-power processor, may identify the state of the electronic device based on the at least one other sensor data, may configure, when the state of the electronic device is changed, the distance measurement interval as a second interval different from the first interval based on the changed state of the electronic device, and may transmit the signal for distance measurement to the external electronic device based on the second interval.

According to various example embodiments, the electronic device may further include a second communication circuit configured to support a second communication scheme, wherein the processor may identify the distance to the external electronic device through the second communication circuit, and may transmit the distance measurement-related information to the first communication circuit when the distance to the external electronic device satisfies a designated first reference.

Figure 3A:
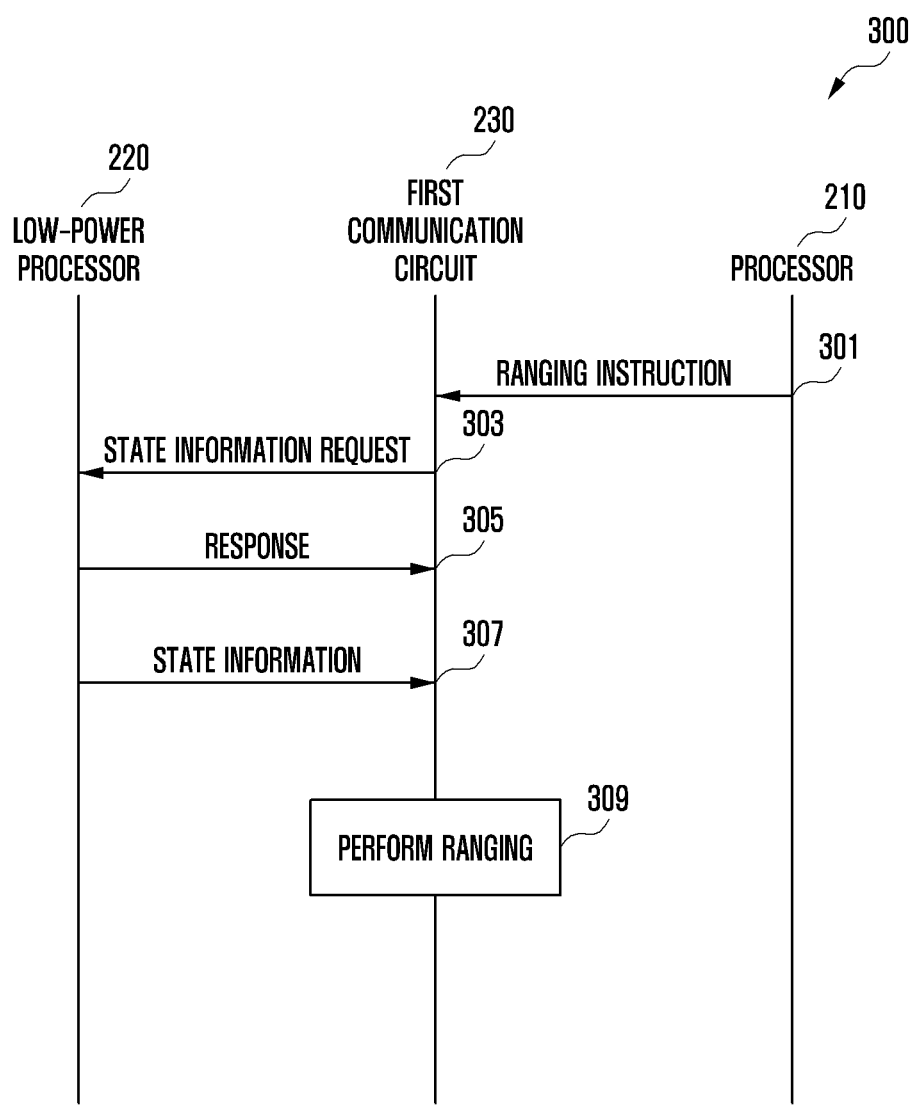
FIG. 3A is a signal flow diagram illustrating a method of performing distance measurement in an electronic device according to various example embodiments.
Figure 4:
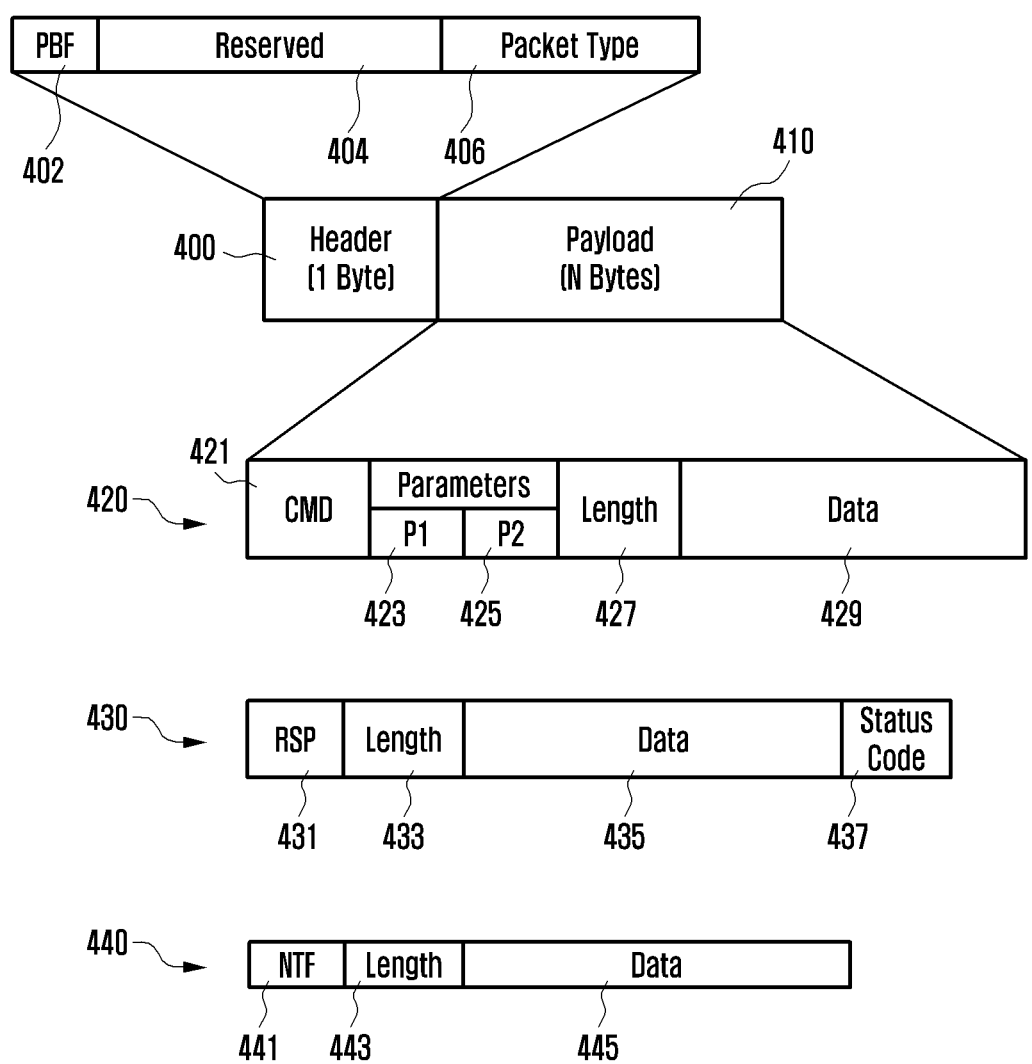
FIG. 4 illustrates a configuration of a distance measurement-related signal according to various example embodiments.

FIG. 3A is a signal flow diagram 300 illustrating a method of performing distance measurement in an electronic device 200 according to various example embodiments. Hereinafter, at least some components of FIG. 3A will be described with reference to FIG. 4. FIG. 4 illustrates a configuration of a distance measurement-related signal according to various example embodiments.

Referring to FIG. 3A, according to various example embodiments, the electronic device 200 may include the processor 210, the low-power processor 220, and/or the first communication circuit 230. According to an example, the processor 210 may include an application processor, the low-power processor 220 may include a sensor hub processor, and the first communication circuit 230 may include a UWB communication circuit. However, the disclosure is not limited thereto, and as such, other configurations are possible according to various example embodiments.

According to various example embodiments, when the occurrence of a distance measurement event is detected, in operation 301, the processor 210 may transmit a distance measurement-related ranging instruction signal to the first communication circuit 230. According to an example embodiment, the distance measurement event may occur when an application program related to distance measurement is executed. According to an example embodiment, the distance measurement event may occur when the processor 210 determines that a distance between the electronic device 200 and the external electronic device which is measured through the second communication circuit 240 (e.g., Bluetooth) is within a designated first distance. For example, the ranging instruction signal may include information instructing the start of distance measurement and/or distance measurement-related configuration information. For example, the distance measurement-related configuration information may include the state of the electronic device 200 and/or a distance measurement interval related to the state of the electronic device 200 required by the application program. For example, the processor 210 may transmit the ranging instruction signal to the first communication circuit 230 and may then be switched to a sleep state, an idle state, or a low-power state.

According to various example embodiments, in operation 303, the first communication circuit 230 may transmit a request signal related to the state of the electronic device 202 to the low-power processor 220 based on the reception of the ranging instruction signal. According to an example embodiment, referring to FIG. 4, the first communication circuit 230 and the low-power processor 220 may transmit and/or receive a signal having a structure including a header 400 and a payload 410. For example, the header 400 may include configuration information 402 of a packet, a type 406 of a signal included in the payload 410, and/or a reserved area 404. For example, the header 400 may include configuration information (e.g., a protocol buffer binary format (PBF)) 402 of a packet, a type (packet type) 406 of a signal (e.g., a packet) included in the payload 410, and/or a reserved area 404. For example, the configuration information 402 of the packet may include information related to the configuration of the packet as shown in Table 1. It can be seen that "b" in "0b" or "1b" indicating the configuration information 402 of the packet may indicate that "0" or "1" is a binary number.

TABLE 1

| PBF | Description |
|---|---|
| 0b | The packet contains a complete message, or the packet contains the last segment of a segmented message |
| 1b | The packet contains a segmented message of a message which is not the last segment |

For example, the type 406 of the signal (e.g., packet) included in the payload 410 may include information related to the type of the signal including the payload 410 as shown in Table 2.

TABLE 2

| Packet type | Description |
|---|---|
| 001b | command packet |
| 010b | response packet |
| 011b | notification packet |
| 000b | RFU |
| 100b-111b | |

For example, in the case of a request signal 420 related to the state of the electronic device 200, the payload 410 may include a request signal type (CMD) 421, a first parameter P1 423, a second parameter P2 425, a length 427 of data, and/or data 429. For example, as shown in Table 3, the request signal type (CMD) 421 may indicate that the payload of the signal is the request signal related to the state of the electronic device 200. In the type 421 of the request signal, "h" from "A0h" may indicate that "A0" is a hexadecimal number. According to an example embodiment, when the request signal type CMD 421 requires a designated state (or operation) of the electronic device 200, the P1 423 may include information for enabling or disabling a response to the designated state of the electronic device 200, and the P2 425 may include state information of the electronic device 200 necessary for configuring a parameter (e.g., a distance measurement interval) for the first communication circuit 230 to perform a ranging procedure.

TABLE 3

| CMD | Description |
|---|---|
| A0h | request for (notification) NTF of specific motion |

For example, the P1 423 may include information for enabling or disabling the response to the state information of the electronic device 200 as shown in Table 4.

TABLE 4

| P1 | Description |
|---|---|
| 00h | disable NTF |
| 01h | enable NTF |

For example, the P2 425 may include the information related to the state of the electronic device 200 required by the first communication circuit 230 as shown in Table 5.

TABLE 5

| P2 | Description |
|---|---|
| 01h | Stop(not moving), when changing from moving state to stationary state |
| 02h | All moving, when changing from stationary state to moving state |
| 04h | Walking, when changing from other state to walking state |
| 08h | Running, when changing from other state to running state |
| 10h | Moving by car |
| 20h | Moving by bicycle |

According to an example embodiment, when the state of the electronic device 200 required by the distance measurement-related application program is "not moving", "walking", and "running", the first communication circuit 230 may transmit the request signal related to the state of the electronic device 200 of 01 A0 01 0D 00 to the low-power processor 220. For example, "01" located at the front of the request signal may indicate the type 406 of the signal (e.g., packet) included in the payload 410, "A0" located after "01" may indicate the type of the request signal CMD 421, "01" located after "A0" may indicate the P1 423 that enables the response, "0D" located after "01" may indicate the P2 425 that is the state of the electronic device 200 required by the distance measurement-related application program, and "00" located at the end may indicate the length 427 of data. For example, the P2 425 may include a value of "0D" based on the sum of "01h" of "not moving", "04h" of "walking", and "08h" of "running". According to various example embodiments, in operation 305, the low-power processor 220 may transmit a response signal to the request signal to the first communication circuit 230. For example, in case of the response signal 430, the payload 410 may include a type RSP 431 of the response signal, a length 433 of data, data 435, and/or a status code 437. For example, the status code 437 of the response signal may include information indicating whether the low-power processor 220 identifies the state of the electronic device 200 as shown in Table 6.

TABLE 6

| RSP | Status Code | Description |
|---|---|---|
| A0h | 00h | STATUS_OK |
|  | 01h | STATUS_FAILED |
|  | 02h | STATUS_ALREADY_DONE |

According to an example embodiment, the low-power processor 220 may transmit a response signal of 02 A0 00 00 in response to the request signal related to the state of the electronic device 200 received from the first communication circuit 230, to the first communication circuit 230. For example, "02" located at the front of the response signal may indicate the type 406 of the signal (e.g., packet) included in the payload 410, "A0" located after "02" may indicate the type RSP 431 of the response signal, "00" located after "A0" may indicate the length 433 of data and include a state in which data does not exist, and "00" located at the end may be a status code 437 indicating that the state of the low-power processor 220 is normal. According to various example embodiments, in operation 307, the low-power processor 220 may transmit the information related to the state of the electronic device 200 to the first communication circuit 230 based on the request signal. According to an example embodiment, when the request signal related to the state of the electronic device 200 is received from the first communication circuit 230 (e.g., operation 303), the low-power processor 220 may acquire sensor data related to the movement of the electronic device 200 from the sensor module 250. The low-power processor 220 may estimate the state of the electronic device 200 based on the sensor data related to the movement of the electronic device 200. The low-power processor 220 may transmit the information related to the state of the electronic device 200 to the first communication circuit 230. For example, in the case 440 of the information related to the state of the electronic device 410, the payload 410 may include a signal type (notification (NTF)) 441, a data length 443, and/or data 445. For example, the data 445 of the information related to the state of the electronic device 200 may include information related to a current state of the electronic device 200 as shown in Table 7.

TABLE 7

| NTF | Data | Description |
|---|---|---|
| A0h | 01h | stop (not moving) |
|  | 04h | walking |
|  | 08h | running |
|  | 10h | moving by car |
|  | 20h | moving by bicycle |

According to an example embodiment, when the state of the electronic device 200 is "walking", the low-power processor 220 may transmit information related to the state of the electronic device 200 of 03 A0 01 04 to the first communication circuit 230. For example, "03" located at the front of the information related to the state of the electronic device 200 may include the type 406 of the signal (e.g., packet) included in the payload 410, "A0" located after "03" may indicate the signal type NTF 441, "01" located after "A0" may indicate the data length 443 included in the data 445, and "04" at the end may include the data 445 indicating the state of "walking" of the electronic device 200. According to various example embodiments, in operation 309, the first communication circuit 230 may perform a ranging procedure for measuring a distance between the electronic device 200 and an external electronic device based on the information related to the state of the electronic device 200 received from the low-power processor 220. According to an example embodiment, the first communication circuit 230 may perform the ranging procedure at a distance measurement interval corresponding to the state of the electronic device 200. As an example, the ranging procedure may include a series of operations for measuring (or estimating) the distance between the electronic device 200 and the external electronic device.

Figure 3B:
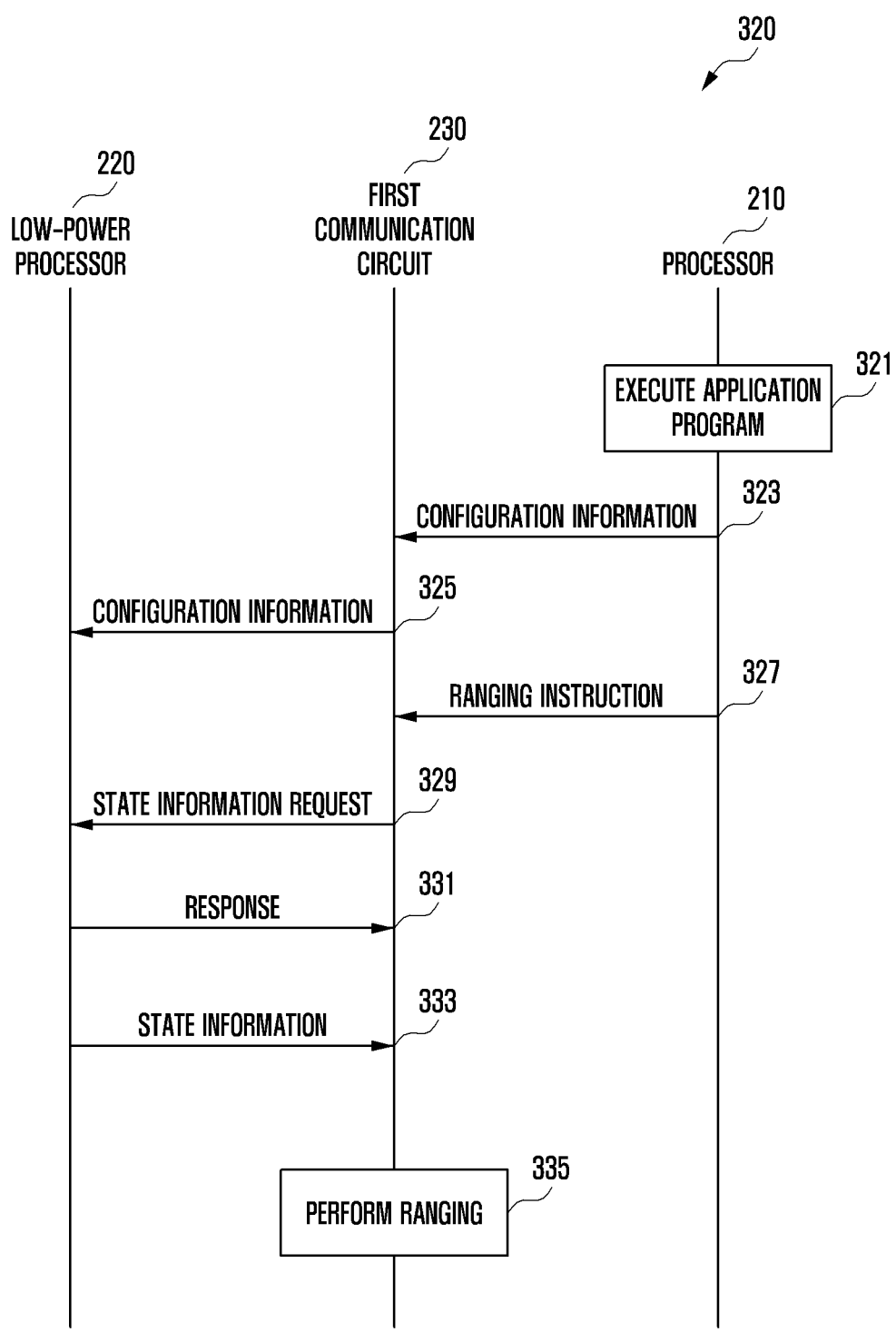
FIG. 3B is a signal flow diagram illustrating a method of transmitting configuration information related to distance measurement in an electronic device according to various example embodiments.

FIG. 3B is a signal flow diagram 320 illustrating a method of transmitting configuration information related to distance measurement in an electronic device according to various example embodiments.

Referring to FIG. 3B, the electronic device 200 may include the processor 210 (e.g., an application processor), the low-power processor 220 (e.g., a sensor hub processor), and/or the first communication circuit 230 (e.g., a UWB communication circuit).

According to various example embodiments, when a distance measurement-related application program is executed in operation 321, in operation 323, the processor 210 may transmit distance measurement-related configuration information to the first communication circuit 230. For example, the distance measurement-related configuration information may include a state of the electronic device 200 and/or a distance measurement interval related to the state of the electronic device 200 required by the application program.

According to various example embodiments, in operation 325, the first communication circuit 230 may transmit information related to the state of the electronic device 200 required by the application program based on the distance measurement-related configuration information to the low-power processor 220. According to an example embodiment, the first communication circuit 230 may determine to prepare for distance measurement based on the distance measurement-related configuration information. The first communication circuit 230 may transmit the information related to the state of the electronic device 200 required by the application program in relation to distance measurement, to the low-power processor 220.

According to various example embodiments, when a distance measurement function of the distance measurement-related application program is executed, in operation 327, the processor 210 may transmit a ranging instruction signal instructing the start of distance measurement to the first communication circuit 230. For example, after transmitting the ranging instruction signal to the first communication circuit 230, the processor 210 may be switched to a sleep state, an idle state, or a low-power state.

According to various example embodiments, in operation 329, the first communication circuit 230 may transmit a request signal related to the state of the electronic device 200 to the low power processor 220 based on the reception of the ranging instruction signal.

According to various example embodiments, in operation 331, the low-power processor 220 may transmit a response signal to the request signal to the first communication circuit 230.

According to various example embodiments, in operation 333, the low-power processor 220 may transmit the information related to the state of the electronic device 200 to the first communication circuit 230 based on the request signal. According to an example embodiment, the low-power processor 220 may identify the state of the electronic device 200 based on sensor data acquired from the sensor module 250. When the state of the electronic device 200 identified based on the sensor data is the state of the electronic device 200 required by the application program, the low-power processor 220 may transmit the information related to the state of the electronic device 200 to the first communication circuit 230.

According to various example embodiments, in operation 335, the first communication circuit 230 may perform a ranging procedure for measuring a distance between the electronic device 200 and an external electronic device based on the information related to the state of the electronic device 200 received from the low-power processor 220. According to an example embodiment, the first communication circuit 230 may configure a distance measurement interval based on distance measurement interval information related to the state of the electronic device 200 received from the processor 210 and the state of the electronic device 200 received from the low-power processor 220. The first communication circuit 230 may perform the ranging procedure based on the distance measurement interval. For example, the ranging procedure may include a series of operations for measuring (or estimating) the distance between the electronic device 200 and the external electronic device.

According to various example embodiments, the first communication circuit 230 may perform the ranging procedure for measuring the distance between the electronic device 200 and the external electronic device based on the state of the electronic device 200. According to an example embodiment, when the state of the electronic device 200 identified based on the sensor data acquired from the sensor module 250 corresponds to the state of the electronic device 200 required by the application program, the low-power processor 220 may transmit the information related to the state of the electronic device 200 to the first communication circuit 230 (e.g., operation 333). The first communication circuit 230 may perform the ranging procedure for measuring the distance between the electronic device 200 and the external electronic device based on the information related to the state of the electronic device 200 received from the low-power processor 220 (e.g., operation 335). In this case, operations 327 to 331 of FIG. 3B may be omitted.

Figure 3C:
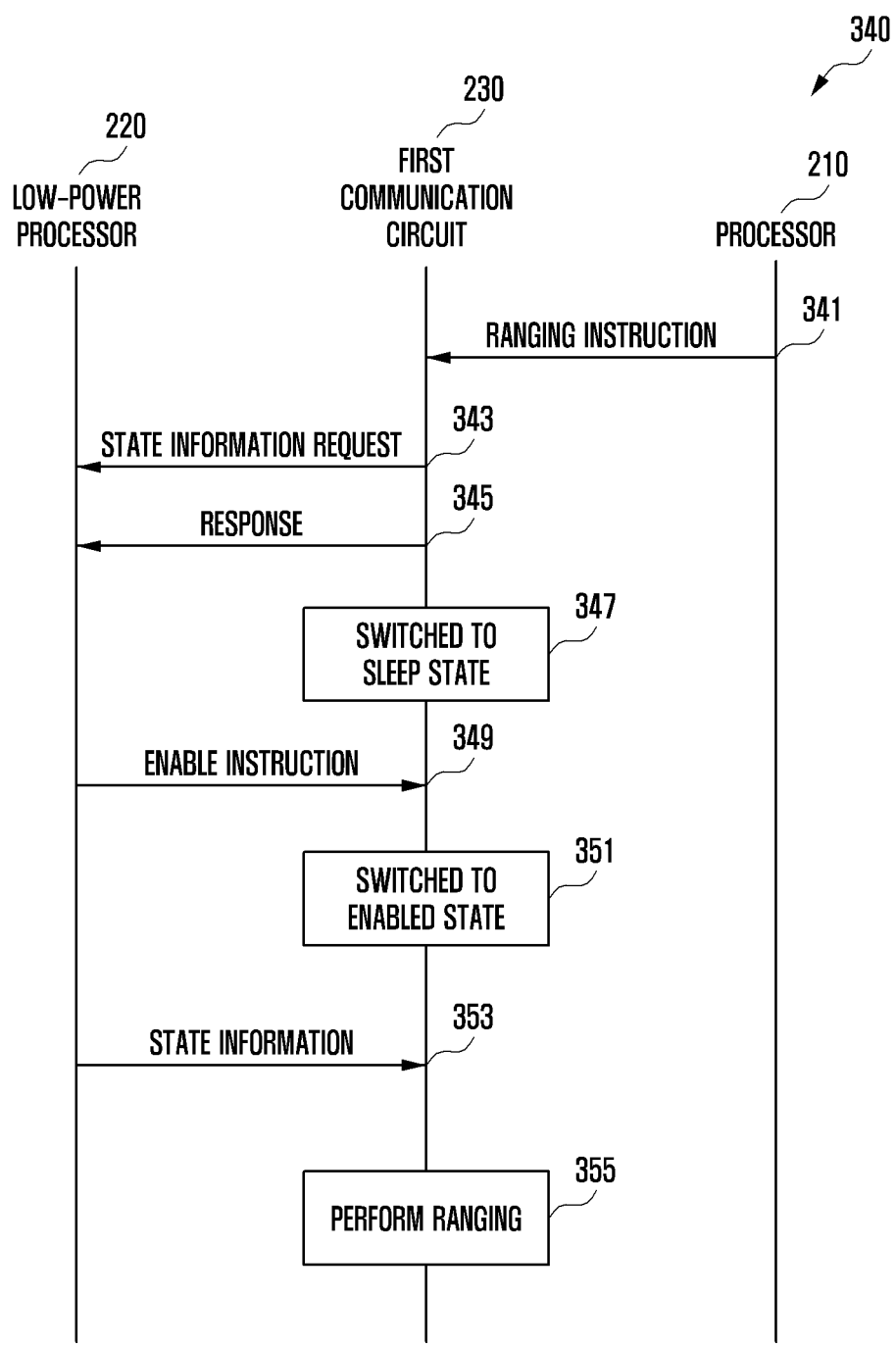
FIG. 3C is a signal flow diagram illustrating a method of switching an operating state of a communication circuit in an electronic device according to various example embodiments.

FIG. 3C is a signal flow diagram 340 illustrating a method of switching an operating state of a communication circuit in an electronic device according to various example embodiments.

Referring to FIG. 3C, according to various example embodiments, the electronic device 200 may include the processor 210 (e.g., an application processor), the low-power processor 220 (e.g., a sensor hub processor), and/or the first communication circuit (e.g., a UWB communication circuit).

According to various example embodiments, in operation 341, when the occurrence of a difference measurement event is detected, the processor 210 may transmit a ranging instruction signal related to the distance measurement to the first communication circuit 230. According to an example embodiment, the distance measurement event may occur based on a distance between the electronic device 200 and an external electronic device measured through the execution of a distance measurement-related application program and/or the second communication circuit 240 (e.g., Bluetooth). For example, the ranging instruction signal may include information instructing the start of distance measurement and/or distance measurement-related configuration information. For example, the processor 210 may transmit the ranging instruction signal to the first communication circuit 230, and may then be switched to a sleep state, an idle state, or a low-power state.

According to various example embodiments, in operation 343, the first communication circuit 230 may transmit a request signal related to the state of the electronic device 200 to the low-power processor 220 based on the reception of the ranging instruction signal. For example, the request signal related to the state of the electronic device 200 may include information related to the state of the electronic device 200 required by the application program.

According to various example embodiments, in operation 345, the low-power processor 220 may transmit a response signal to the request signal to the first communication circuit 230.

According to various example embodiments, in operation 347, the first communication circuit 230 may be switched to the sleep state based on the response signal received from the low-power processor 220. According to an example embodiment, the first communication circuit 230 may operate in the sleep state in which a signal is not transmitted to the low-power processor 220 and/or received from the low-power processor 220 during a sleep time based on the response signal. The first communication circuit 230 may be enabled at a designated period to receive the signal of the low-power processor 220 in the sleep state to determine whether the received signal exists.

According to various example embodiments, when the state of the electronic device 200 is identified based on the request signal, in operation 349, the low-power processor 220 may transmit an enabling indication-related signal to the first communication circuit 230.

According to various example embodiments, in operation 351, the first communication circuit 230 may be switched to an enabled state based on the enabling instruction signal received from the low-power processor 220. According to an example embodiment, when the first communication circuit 230 is switched to the enabled state, the first communication circuit 230 may transmit information related to an enabled state transition in response to the enabling instruction signal to the low-power processor 220.

According to various example embodiments, in operation 353, the low-power processor 220 may transmit the information related to the state of the electronic device 200 to the enabled first communication circuit 230. According to an example embodiment, when it is determined that the first communication circuit 230 is switched to the enabled state based on the information related to the enabled state transition from the first communication circuit 230, the low-power processor 220 may transmit the information related to the state of the electronic device 200 to the first communication circuit 230.

According to various example embodiments, in operation 355, the first communication circuit 230 may perform a ranging procedure for measuring the distance between the electronic device 200 and the external electronic device based on the information related to the state of the electronic device 200 received from the low-power processor 220. According to an example embodiment, the first communication circuit 230 may perform the ranging procedure at a distance measurement interval corresponding to the state of the electronic device 200. For example, the ranging procedure may include a series of operations for measuring (or estimating) the distance between the electronic device 200 and the external electronic device.

According to various example embodiments, the first communication circuit 230 may transmit a result obtained by performing the ranging procedure for estimating the distance between the electronic device 200 and the external electronic device to the processor 210 based on the information related to the state of the electronic device 200 received from the low-power processor 220. For example, when the distance between the electronic device 200 and the external electronic device is within a threshold value, the first communication circuit 230 may transmit the ranging result to the processor 210 which is in a sleep state, an idle state, or a low-power state.

According to various example embodiments, the first communication circuit 230 may repeatedly perform the ranging procedure for measuring the distance between the electronic device 200 and the external electronic device. According to an example embodiment, when the ranging procedure is performed (e.g., operation 355), the first communication circuit 230 may be switched to the sleep state (e.g., operation 347). The first communication circuit 230 may be switched to the enabled state based on the enabling instruction signal received from the low-power processor 220 to perform the ranging procedure again. For example, the first communication circuit 230 and the low-power processor 220 may perform repeatedly operations 347 to 355 of FIG. 3C. According to an example embodiment, the first communication circuit 230 may perform the ranging procedure again based on the information related to the state of the electronic device 200 received from the low-power processor 220. For example, the first communication circuit 230 and the low-power processor 220 may perform operations 353 to 355 of FIG. 3C repeatedly.

Figure 5:
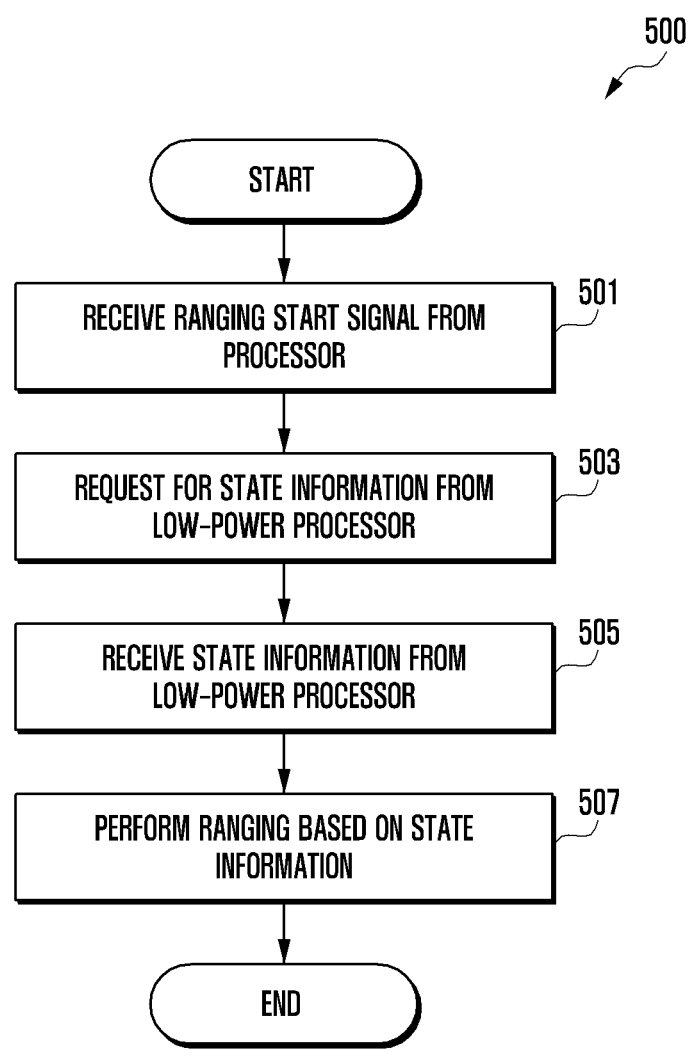
FIG. 5 is a flowchart illustrating a method of performing distance measurement based on state information of an electronic device in the electronic device according to various example embodiments.

FIG. 5 is a flowchart 500 illustrating a method of performing distance measurement based on state information of an electronic device in the electronic device according to various example embodiments. Hereinafter, in the following embodiment, respective operations may be performed sequentially, but are not necessarily performed sequentially. For example, the order of each operation may be changed, and at least two operations may be performed in parallel. For example, the electronic device of FIG. 5 may be the electronic device 101 of FIG. 1 or the electronic device 200 of FIG. 2.

Referring to FIG. 5, according to various example embodiments, in operation 501, a first communication circuit (e.g., the wireless communication module 192 of FIG. 1 or the first communication circuit 230 of FIG. 2) of the electronic device may receive a ranging start signal from a processor (e.g., the processor 210 of FIG. 2). For example, the ranging start signal may include information related to a distance measurement interval corresponding to the state of the electronic device. For example, the ranging start signal may be generated by the processor 210 when a distance measurement-related application program is executed or when a distance between the electronic device 200 and an external electronic device (e.g., the electronic device 102 of FIG. 1) which is measured through the second communication circuit 240 (e.g., Bluetooth) is within a designated first distance.

According to various example embodiments, in operation 503, the first communication circuit (e.g., the wireless communication module 192 or the first communication circuit 230) of the electronic device may transmit a request signal related to the state information of the electronic device to a low-power processor (e.g., the low-power processor 220 of FIG. 2). According to an example embodiment, referring to FIG. 4, the request signal may be configured as shown in Table 8 when the first communication circuit 230 requires the state of not moving, walking, and/or running. For example, P2 may include a value of "0D" based on the sum of "01h" of "not moving", "04h" of "walking" and "08h" of "running".

TABLE 8

| Packet Type | CMD | P1 | P2 | Length |
|---|---|---|---|---|
| 01 | A0 | 01 | 0D | 00 |

According to various example embodiments, in operation 505, the first communication circuit (e.g., the wireless communication module 192 or the first communication circuit 230) of the electronic device may receive information related to the state of the electronic device from the low-power processor (e.g., the low-power processor 220 of FIG. 2). According to an example embodiment, the first communication circuit 230 may receive a response signal configured as shown in Table 9 in response to the request signal.

TABLE 9

| Packet Type | RSP | Length | Status Code |
|---|---|---|---|
| 02 | A0 | 00 | 00 |

According to an example embodiment, the information related to the state of the electronic device 200 may be configured as shown in Table 10 when the state of the electronic device 200 is "walking" with reference to FIG. 4.

TABLE 10

| Packet Type | NTF | Length | Status Code |
|---|---|---|---|
| 03 | A0 | 01 | 04 |

According to various example embodiments, in operation 507, the first communication circuit (e.g., the wireless communication module 192 or the first communication circuit 230) of the electronic device may perform the ranging procedure for measuring the distance to the external electronic device based on the information related to the state of the electronic device. According to an example embodiment, the first communication circuit 230 may configure a distance measurement interval (e.g., a ranging interval) based on the state of the electronic device 200. The first communication circuit 230 may perform the ranging procedure based on the distance measurement interval corresponding to the state of the electronic device 200. According to various example embodiments, the first communication circuit 230 of the electronic device 200 may perform a designated operation based on the ranging result. According to an example embodiment, when the external electronic device is a door lock, the first communication circuit 230 may perform an operation of requesting unlocking of the external electronic device based on a determination that the electronic device 200 and the external electronic device are close to each other within a designated distance based on the ranging result. When the external electronic device is a door lock, the first communication circuit 230 may perform an operation of requesting locking of the external electronic device based on a determination that the electronic device 200 and the external electronic device are separated from each other by a designated distance or more based on the ranging result. According to an example embodiment, when the external electronic device is a vehicle, the first communication circuit 230 may perform an operation of requesting to open the door of the vehicle or to start the engine of the vehicle based on a determination that the electronic device 200 and the external electronic device are close to each other within the designated distance based on the ranging result. According to an example embodiment, when the external electronic device is a vehicle, the first communication circuit 230 may perform an operation of requesting to lock the door of the vehicle or to turn off the engine of the vehicle based on a determination that the electronic device 200 and the external electronic device are separated from each other by the designated distance or more based on the ranging result.

According to various example embodiments, the first communication circuit 230 of the electronic device 200 may configure a period (or interval) in which the low-power processor 220 transmits the information related to the state of the electronic device 200 based on the information related to the state of the electronic device 200 received from the low-power processor 220. The first communication circuit 230 may transmit a period of transmitting the information related to the state of the electronic device 200 to the low-power processor 220.

Figure 6A:
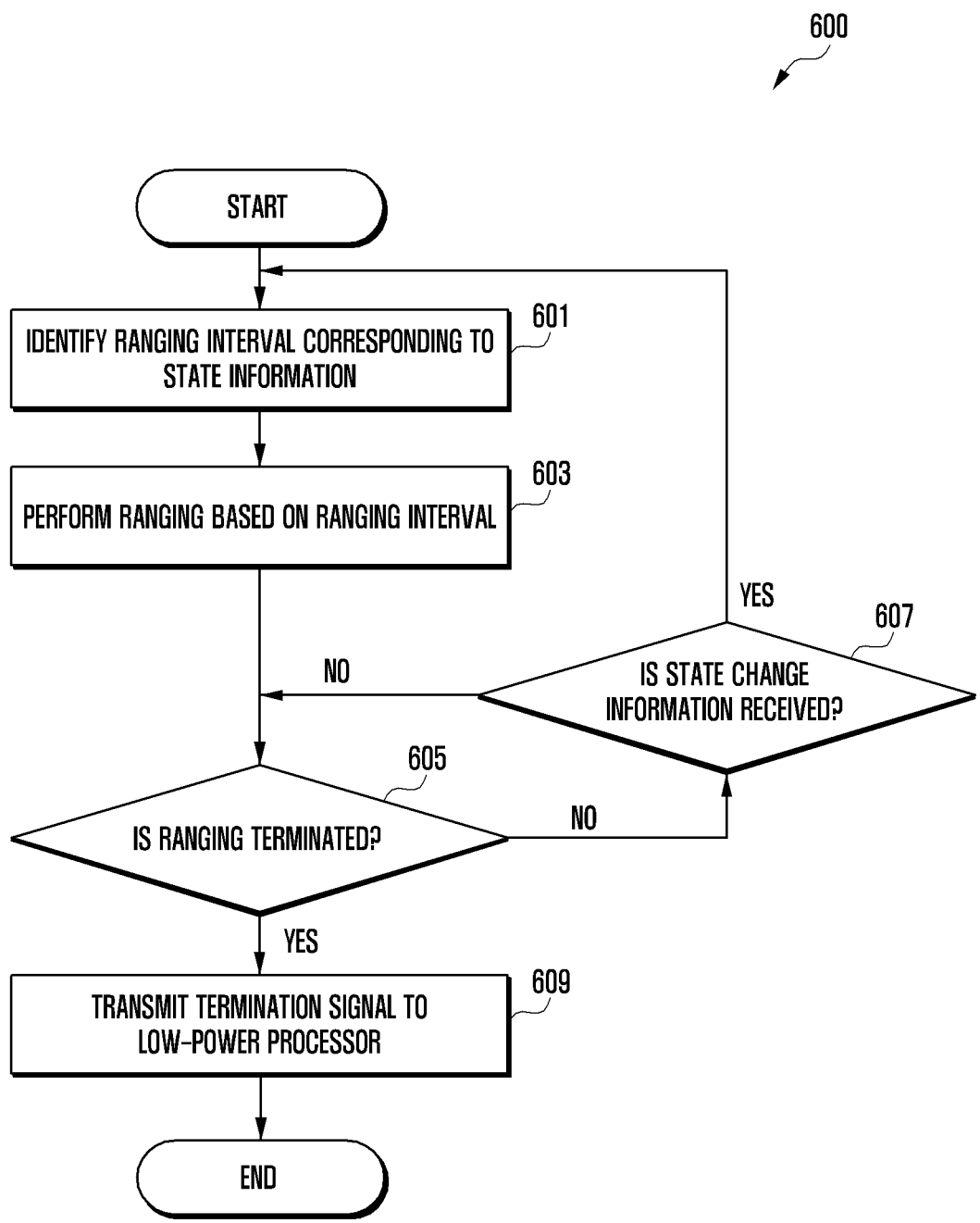
FIG. 6A is a flowchart illustrating a method of configuring a distance measurement interval in an electronic device according to various example embodiments.
Figure 7A:
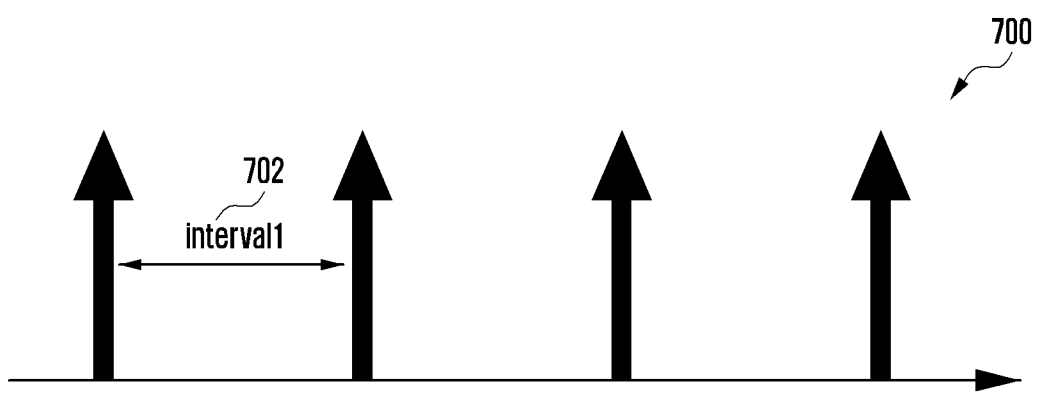
FIGS. 7A-7C are diagrams illustrating a distance measurement interval configured based on state information of an electronic device according to various example embodiments.
Figure 7B:
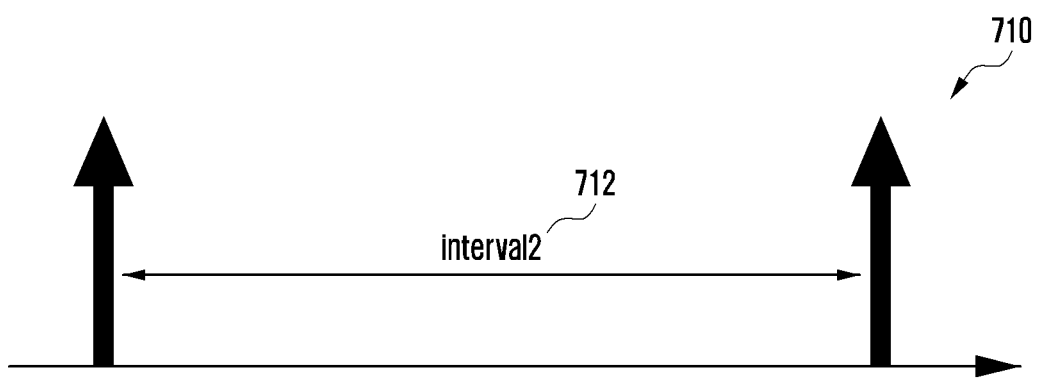
Figure 7C:
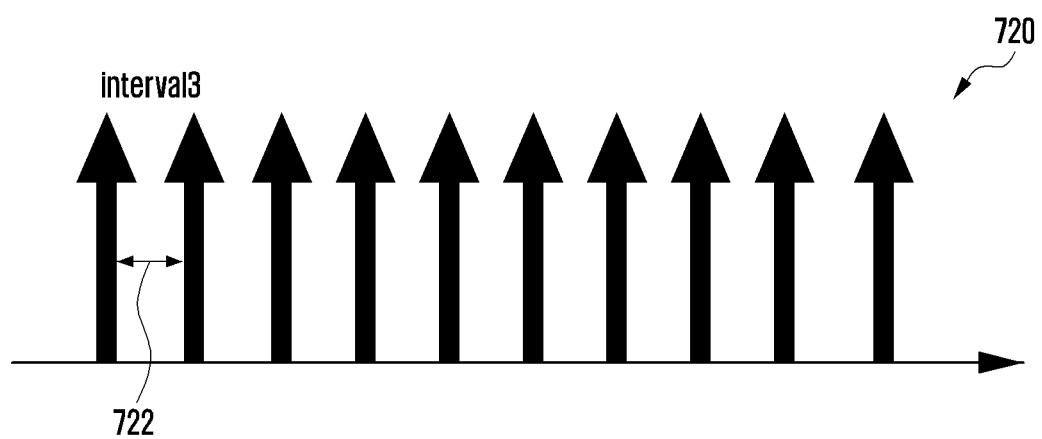

FIG. 6A is a flowchart 600 illustrating a method of configuring a distance measurement interval in an electronic device according to various example embodiments. Operations of FIG. 6A which will be described hereinafter may be detailed operations of operation 507 of FIG. 5. Hereinafter, in the following embodiment, respective operations may be performed sequentially, but are not necessarily performed sequentially. For example, the order of each operation may be changed, and at least two operations may be performed in parallel. For example, the electronic device of FIG. 6A may be the electronic device 101 of FIG. 1 or the electronic device 200 of FIG. 2. Hereinafter, at least some components of FIG. 6A may be described with reference to FIGS. 7A-7C. FIGS. 7A-7C are diagrams illustrating a distance measurement interval configured based on state information of an electronic device according to various example embodiments.

Referring to FIG. 6A, according to various example embodiments, when information related to the state of the electronic device is received from a low-power processor (e.g., the low-power processor 220 of FIG. 2) (e.g., operation 505 of FIG. 5), in operation 601, a first communication circuit (e.g., the wireless communication module 192 of FIG. 1 or the first communication circuit 230 of FIG. 2) may identify a distance measurement interval (e.g., a ranging interval) corresponding to the state of the electronic device. According to an example embodiment, referring to FIG. 7A, when the state of the electronic device 200 is "walking" in 700, the first communication circuit 230 may determine that distance measurement is performed at a first interval 702. For example, when the state of "walking" of the electronic device 200 is maintained for a designated second time, the first communication circuit 230 may adjust the distance measurement interval as the first interval 702.

According to various example embodiments, in operation 603, the first communication circuit (e.g., the wireless communication module 192 or the first communication circuit 230) of the electronic device may perform a ranging procedure based on the distance measurement interval corresponding to the state of the electronic device. According to an example embodiment, the first communication circuit 230 may transmit a ranging signal to an external electronic device at each distance measurement interval. The first communication circuit 230 may measure (or estimate) a distance between the electronic device 200 and the external electronic device based on a difference between a time point when the ranging signal is transmitted to the external electronic device and a time point when a ranging response signal is received from the external electronic device.

According to various example embodiments, in operation 605, the first communication circuit (e.g., the wireless communication module 192 or the first communication circuit 230) of the electronic device may determine whether the ranging procedure for measuring the distance to the external electronic device is terminated. According to an example embodiment, when a ranging termination signal is received from the processor 210, the first communication circuit 230 may determine that the ranging procedure is terminated. For example, the ranging termination signal may be generated by the processor 210 when the execution of a distance measurement-related application program is terminated or when the distance between the electronic device 200 and the external electronic device which is measured through the second communication circuit 240 (e.g., Bluetooth) exceeds a designated first distance.

According to various example embodiments, in operation 607, when the ranging procedure for measuring the distance to the external electronic device is maintained (e.g., "NO" of operation 605), the first communication circuit (e.g., the wireless communication module 192 or the first communication circuit 230) of the electronic device may determine whether state change information is received from the low-power processor (e.g., the low-power processor 220 of FIG. 2). According to an example embodiment, the low-power processor 220 may identify (or estimate) the state of the electronic device 200 based on sensor data provided from the sensor module 250 periodically or continuously. According to an example embodiment, when a measured sensor value fluctuates periodically or in a designated range or more, the sensor module 250 may transmit sensor data to the low-power processor 220. When the state of the electronic device 200 is changed, the low-power processor 220 may transmit information related to a change in the state of the electronic device 200 to the first communication circuit 230.

According to various example embodiments, when the state change information is not received (e.g., "NO" of operation 607, in operation 605, the first communication circuit (e.g., the wireless communication module 192 or the first communication circuit 230) of the electronic device may determine whether the ranging procedure for measuring the distance to the external electronic device is terminated. According to an example embodiment, the first communication circuit 230 may determine whether a ranging termination signal is received from the processor 210. According to an example embodiment, when the state change information is not received from the low-power processor 220 (e.g., "NO" of operation 607), the first communication circuit 230 may periodically perform a ranging operation until the ranging termination signal is received from the processor 210, without changing a ranging interval.

According to various example embodiments, when the state change information is received (e.g., "YES" of operation 607), in operation 601, the first communication circuit (e.g., the wireless communication module 192 or the first communication circuit 230) of the electronic device may identify a distance measurement interval (e.g., a ranging interval) corresponding to the changed state of the electronic device. According to an example embodiment, referring to FIG. 7B, when the state of the electronic device 200 is changed to "not moving" in 710, the first communication circuit 230 may determine to perform distance measurement at a second interval 712. For example, when the state of "not moving" of the electronic device 200 is maintained for a designated first time period, the first communication circuit 230 may determine to adjust the distance measurement interval as a second interval 712. In this case, the first communication circuit 230 may continuously perform the ranging procedure by adjusting the distance measurement interval as the second interval 712. For example, the second interval 712 may be configured to be relatively longer than the first interval 702.

According to an example embodiment, referring to FIG. 7C, when the state of the electronic device 200 is changed to "running" in 720, the first communication circuit 230 may determine to perform distance measurement at a third interval 722. For example, when the state of "running" of the electronic device 200 is maintained for a designated third time period, the first communication circuit 230 may determine to adjust the distance measurement interval as the third interval 722. In this case, the first communication circuit 230 may continuously perform the ranging procedure by adjusting the distance measurement interval as the third interval 722. For example, the third interval 722 may be configured to be relatively shorter than the first interval 702 and the second interval 712. According to an example embodiment, some of the first interval 702, the second interval 712, and/or the third interval 722 may be different or the same. According to an example embodiment, some of the first time period, the second time period, and/or the third time period for detecting the state change of the electronic device 200 may be different or the same.

According to various example embodiments, when the ranging procedure for measuring the distance to the external electronic device is terminated (e.g., "YES" of operation 605), in operation 609, the first communication circuit (e.g., the wireless communication module 192 or the first communication circuit 230) of the electronic device may transmit a ranging termination-related signal to the low-power processor (e.g., the low-power processor 220 of FIG. 2). According to an example embodiment, the low-power processor 220 may terminate an operation of identifying the state of the electronic device 200 based on the ranging termination-related signal provided from the first communication circuit 230.

According to various example embodiments, when interval-based ranging is performed through the first communication circuit 230, the electronic device 200 may update a value of "block interval" of a ranging interval update IE (RIUIE) at the distance measurement interval corresponding to the state of the electronic device 200, as shown in Table 11. For example, table 11 may include RIUIE defined in clause 7.4.4.34 of the standard document IEEE 802.15.4z.

802.15.4z. For example, the value of "updated block duration" may be expressed as a multiple of a minimum block length min block length corresponding to the distance measurement interval to be changed.

TABLE 12

| Octets: 1 | 3 | 1/0 | 2/0 |
|---|---|---|---|
| relative ranging block index | updated block duration | undated ranging round duration | updated slot duration |

Figure 6B:
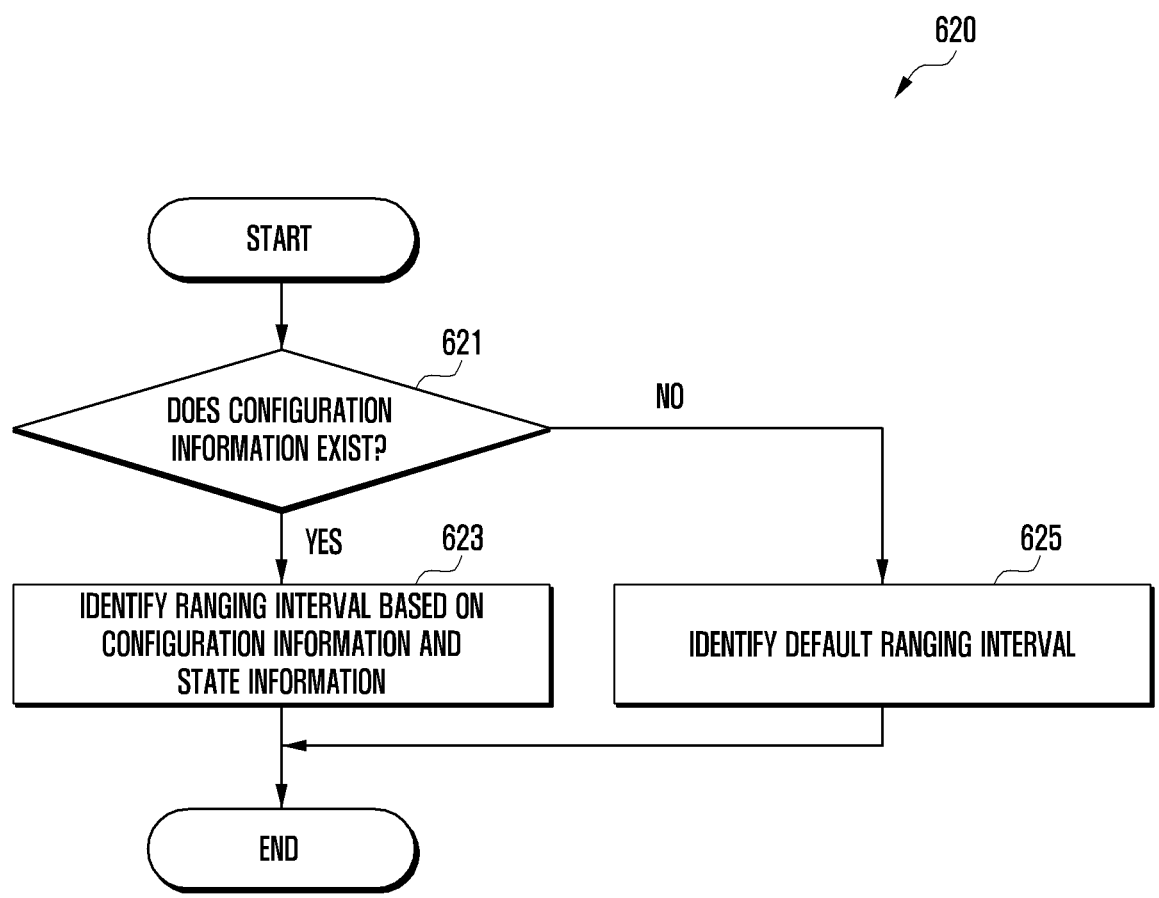
FIG. 6B is a flowchart illustrating a method of selectively configuring a distance measurement interval in an electronic device according to various example embodiments.

FIG. 6B is a flowchart illustrating a method of selectively configuring a distance measurement interval in an electronic device according to various example embodiments. Hereinafter, operations of FIG. 6B may be detailed operations of operation 601 of FIG. 6A. Hereinafter, in the following embodiment, respective operations may be performed sequentially, but are not necessarily performed sequentially. For example, the order of each operation may be changed, and at least two operations may be performed in parallel. For example, the electronic device of FIG. 6B may be the electronic device 101 of FIG. 1 or the electronic device 200 of FIG. 2. Referring to FIG. 6B, according to various example embodiments, when the information related to the state of the electronic device is received from the low-power processor (e.g., the low-power processor 220) (e.g., operation 505 of FIG. 5), in operation 621, the first communication circuit (e.g., the wireless communication module 192 of FIG. 1 or the first communication circuit 230 of FIG. 2) of the electronic device may determine whether distance measurement-related configuration information exists. For example, the state of the electronic device 200 required by the application program and/or the distance measurement interval related to the state of the electronic device 200 may be included.

According to various example embodiments, when the distance measurement-related configuration information exists (e.g., "YES" of operation 621), in operation 623, the first communication circuit (e.g., the wireless communication module 192 or the first communication circuit 230) of the electronic device may identify the distance measurement interval (e.g., the ranging interval) based on the distance measurement-related configuration information and the state of the electronic device. According to an example embodiment, the first communication circuit 230 may identify the distance measurement interval corresponding to the state of the electronic device 200 provided from the low-power

TABLE 11

| Octets: 1 | 4 | 0/2 | 0/2 | 0/1 | 0/1 | 0/2 | 0/1/2/4 |
|---|---|---|---|---|---|---|---|
| content control | block interval | next round interval | RIUM interval | remaining number of RIUMs | RTW multiplier | RTW initial size | current round set index |

According to various example embodiments, when block-based ranging is performed through the first communication circuit 230, the electronic device 200 may update a value of "update block duration" of a ranging block update IE (RBUIE) at the distance measurement interval corresponding to the state of the electronic device 200, as shown in Table 12. For example, Table 12 may include RBUIE defined in clause 7.4.4.36 of the standard document IEEE processor 220 from the distance measurement interval related to the state of the electronic device 200 provided from the processor 210.

According to various example embodiments, when the distance measurement-related configuration information does not exist (e.g., "NO" of operation 621), in operation 625, the first communication circuit (e.g., the wireless communication module 192 or the first communication circuit 230) of the electronic device may identify a default ranging interval. According to an example embodiment, when the distance measurement-related configuration information is not received from the processor 210, the first communication circuit 230 may determine that the distance measurement interval cannot be configured based on the state of the electronic device 200. In this case, the first communication circuit 230 may identify a designated default raging interval. For example, the default ranging interval may include a ranging interval previously defined in the electronic device 200.

Figure 8:
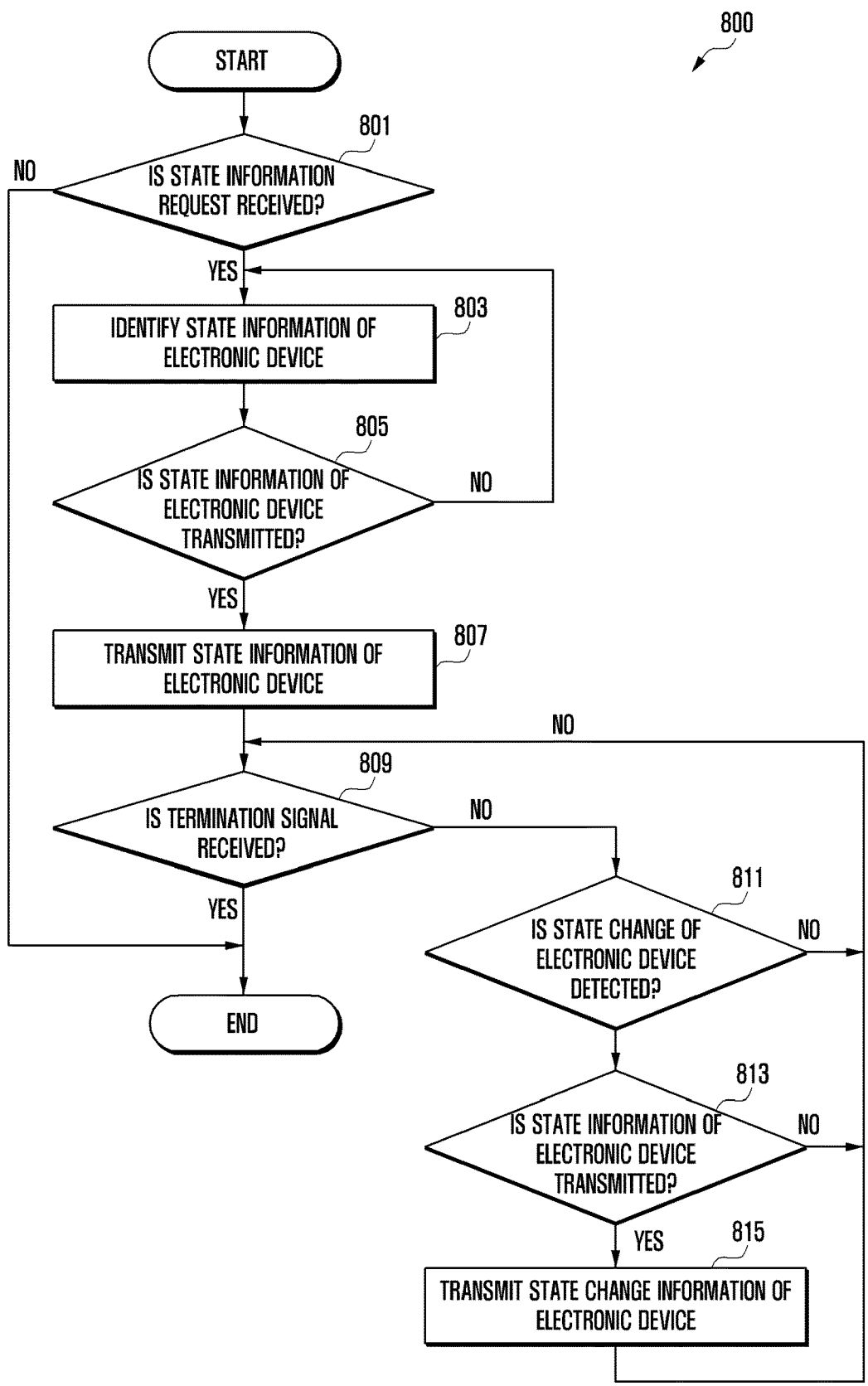
FIG. 8 is a flowchart illustrating a method of providing information related to a state of an electronic device in the electronic device according to various example embodiments.

FIG. 8 is a flowchart 800 illustrating a method of providing information related to the state of an electronic device in the electronic device according to various example embodiments. Hereinafter, respective operations may be performed sequentially, but are not necessarily performed sequentially. For example, the order of each operation may be changed, and at least two operations may be performed in parallel. For example, the electronic device of FIG. 8 may be the electronic device 101 of FIG. 1 or the electronic device 200 of FIG. 2.

Referring to FIG. 8, according to various example embodiments, in operation 801, the low-power processor (e.g., the auxiliary processor 123 of FIG. 1 or the low-power processor 220 of FIG. 2) of the electronic device may determine whether a request signal related to state information of the electronic device is received from the first communication circuit (e.g., the first communication circuit 230 of FIG. 2).

According to various example embodiments, when the request signal related to the state information of the electronic device is received (e.g., "YES" of operation 801), in operation 803, the low-power processor (e.g., the auxiliary processor 123 or the low-power processor 220) of the electronic device may identify the state of the electronic device based on the information received from the sensor module 250.

According to various example embodiments, in operation 805, the low-power processor (e.g., the auxiliary processor 123 or the low-power processor 220) of the electronic device may determine whether to transmit the information related to the state of the electronic device to the first communication circuit (e.g., the first communication circuit 230). According to an example embodiment, the low-power processor 220 may identify a list of the states (e.g., not moving, walking, or running) of the electronic device 200 required by the first communication circuit 230 based on the request signal related to the state information of the electronic device 200. The low-power processor 220 may determine whether the current state of the electronic device 200 identified based on at least one sensor data provided from the sensor module 250 is included in the list of the states of the electronic device 200 required by the first communication circuit 230. For example, when the current state of the electronic device 200 is included in the state list of the electronic device 200 required by the first communication circuit 230, the low-power processor 220 may transmit the information related to the state of the electronic device 200 to the first communication circuit 230. For example, when the current state of the electronic device 200 is not included in the state list of the electronic device 200 required by the first communication circuit 230, the low-power processor 220 may determine that the information related to the state of the electronic device 200 cannot be transmitted to the first communication circuit 230.

According to various example embodiments, when it is determined that the information related to the state of the electronic device cannot be transmitted to the first communication circuit (e.g., the first communication circuit 230) (e.g., "NO" of operation 805), in operation 803, the low-power processor (e.g., the auxiliary processor 123 or the low-power processor 220) of the electronic device may identify the state of the electronic device based on the information (e.g., sensor data) received from the sensor module 250.

According to various example embodiments, when it is determined that the information related to the state of the electronic device can be transmitted to the first communication circuit (e.g., the first communication circuit 230) (e.g., "YES" of operation 805), in operation 807, the low-power processor (e.g., the auxiliary processor 123 or the low-power processor 220) of the electronic device may transmit the information related to the electronic device to the first communication circuit (e.g., the first communication circuit 230). According to an example embodiment, referring to FIG. 4, when the state of the electronic device 200 is "not moving", the information related to the electronic device 200 may be configured as shown in Table 13.

TABLE 13

| Packet Type | NTF | Length | Status Code |
|---|---|---|---|
| 03 | A0 | 01 | 01 |

According to various example embodiments, in operation 809, the low-power processor (e.g., the auxiliary processor 123 or the low-power processor 220) of the electronic device may determine whether the ranging termination-related signal is received from the first communication circuit (e.g., the first communication circuit 230). According to various example embodiments, when the ranging termination-related signal is not received (e.g., "NO" of operation 809), in operation 811, the low-power processor (e.g., the auxiliary processor 123 or the low-power processor 220) of the electronic device may determine whether a change in the state of the electronic device is detected. According to an example embodiment, the low-power processor 220 may periodically identify the state of the electronic device 200 based on the at least one sensor data provided from the sensor module 250. The low-power processor 220 may determine whether the state of the electronic device 200 identified at the current time point is different from the state of the electronic device 200 identified at the previous time point.

According to various example embodiments, when the state change of the electronic device is detected (e.g., "YES" of operation 811), in operation 813, the low-power processor (e.g., the auxiliary processor 123 or the low-power processor 220) of the electronic device may determine whether to transmit the information related to the state change of the electronic device to the first communication circuit (e.g., the first communication circuit 230). According to an example embodiment, the low-power processor 220 may determine whether the changed state of the electronic device 200 is included in the state list of the electronic device 200 required by the first communication circuit 230 based on the at least one sensor data provided from the sensor module 250. For example, when the changed state of the electronic device 200 is included in the state list of the electronic device 200 required by the first communication circuit 230, the low-power processor 220 may determine that the information related to the state change of the electronic device 200 can be transmitted to the first communication circuit 230. For example, when the changed state of the electronic device 200 is not included in the state list of the electronic device 200 required by the first communication circuit 230, the low-power processor 220 may determine that the information related to the state change of the electronic device 200 cannot be transmitted to the first communication circuit 230.

According to various example embodiments, when it is determined that the information related to the state change of the electronic device can be transmitted to the first communication circuit (e.g., the first communication circuit 230) (e.g., "YES" of operation 813), in operation 815, the low-power processor (e.g., the auxiliary processor 123 or the low-power processor 220) of the electronic device may transmit the information related to the state change of the electronic device to the first communication circuit (e.g., the first communication circuit 230). According to an example embodiment, when the state of the electronic device 200 is changed to "running", the low-power processor 220 may configure the information related to the state change of the electronic device 200 as shown in Table 14, and may transmit the resultant data to the first communication circuit 230.

TABLE 14

| Packet Type | NTF | Length | Status Code |
|---|---|---|---|
| 03 | A0 | 01 | 08 |

According to various example embodiments, when it is determined that the state change of the electronic device is not detected (e.g., "NO" of operation 811), when it is determined that the information related to the state change of the electronic device cannot be transmitted to the first communication circuit (e.g., the first communication circuit 230) (e.g., "NO" of operation 813), or when the information related to the state change of the electronic device is transmitted to the first communication circuit (e.g., operation 815), in operation 809, the low-power processor (e.g., the auxiliary processor 123 or the low-power processor 220) of the electronic device may determine whether the ranging termination-related signal is received from the first communication circuit (e.g., the first communication circuit 230). According to various example embodiments, when the ranging termination-related signal is received from the first communication circuit (e.g., the first communication circuit 230) (e.g., "YES" of operation 807), the low-power processor (e.g., the auxiliary processor 123 or the low-power processor 220) of the electronic device may determine that the distance measurement operation of the electronic device is terminated. According to an example embodiment, when the distance measurement operation is terminated, the low-power processor 220 may terminate a series of operations of identifying the state information of the electronic device 200.

According to various example embodiments, in operation 805 of FIG. 8, when it is determined that the information related to the state of the electronic device cannot be transmitted to the first communication circuit (e.g., the first communication circuit 230) (e.g., "NO" of operation 805), the low-power processor (e.g., the auxiliary processor 123 or the low-power processor 220) of the electronic device 200 may determine whether the ranging termination-related signal is received from the first communication circuit (e.g., the first communication circuit 230). For example, when the ranging termination-related signal is received from the first communication circuit, the low-power processor may terminate a series of operations of identifying the state information of the electronic device.

Figure 9:
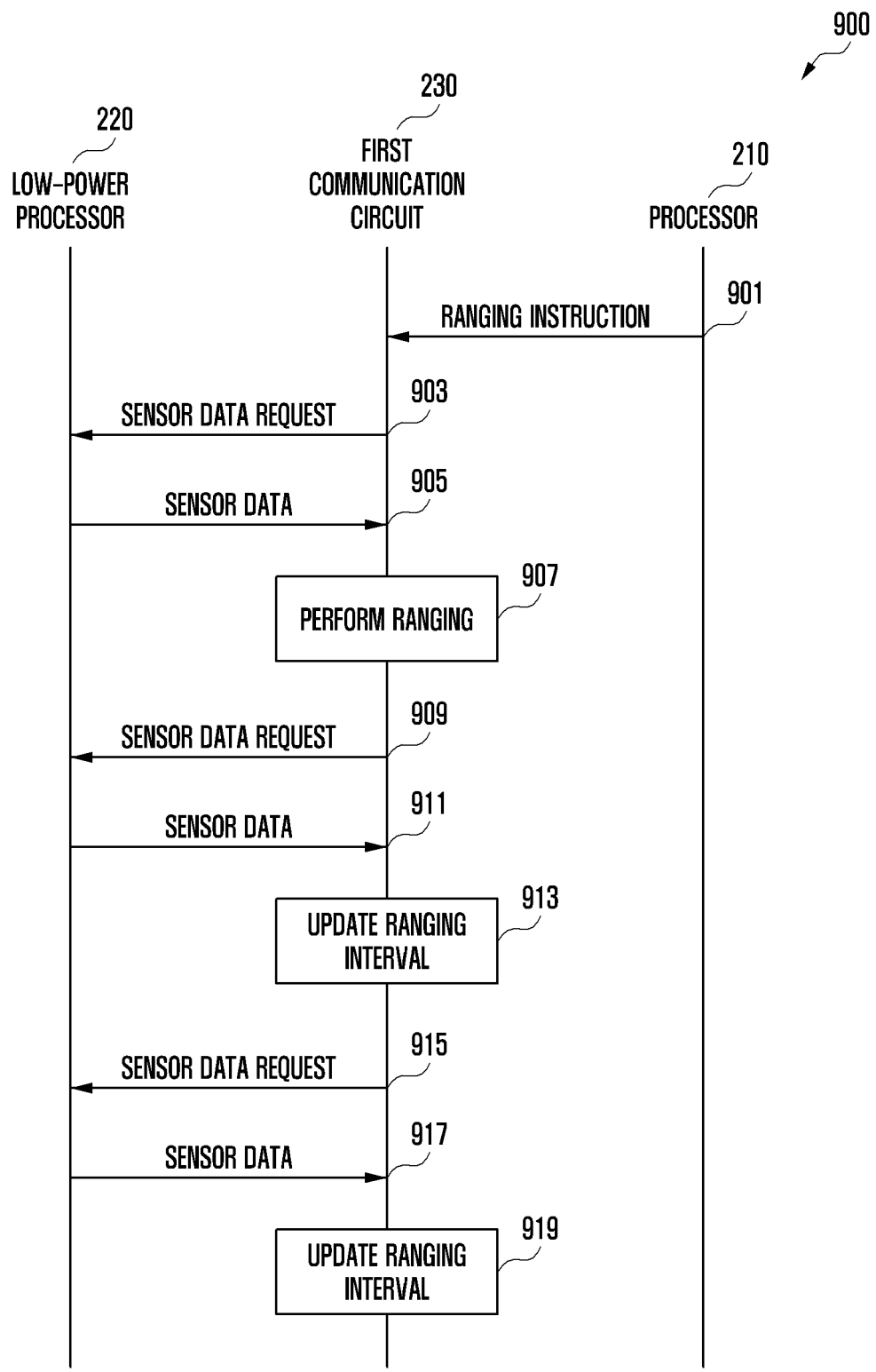
FIG. 9 is an example of a signal flow diagram illustrating a method of providing information related to a state of an electronic device in the electronic device according to various example embodiments.

FIG. 9 is an example of a signal flowchart 900 illustrating a method of providing information related to the state of an electronic device in the electronic device according to various example embodiments.

Referring to FIG. 9, according to various example embodiments, the electronic device 200 may include the processor 210 (e.g., an application processor), the low-power processor 220 (e.g., a sensor hub processor), and/or the first communication circuit 230 (e.g., a UWB communication circuit).

According to various example embodiments, when the occurrence of a distance measurement event is detected, in operation 901, the processor 210 may transmit a ranging instruction signal related to the start of distance measurement to the first communication circuit 230. For example, after the ranging instruction signal is transmitted, the processor 210 may be switched to a sleep state, an idle state, or a low-power state.

According to various example embodiments, in operation 903, the first communication circuit 230 may transmit a sensor data-related request signal to the low-power processor 220 based on the ranging instruction signal. For example, referring to FIG. 4, the payload 410 of the sensor data-related request signal may include a type CMD 421 of the request signal, a first parameter P1 423, a second parameter P2 425, a length 427 of data, and/or data 429. For example, the type CMD 421 of the request signal may indicate that the payload of the signal is the sensor data-related request signal as shown in Table 15.

TABLE 15

| CMD | Description |
|---|---|
| A1h | request for sensor data |

According to an example embodiment, when the type CMD 421 of the request signal is the sensor data-related request signal, the P1 423 may require a fixed value of the sensor data required by the first communication circuit 230, and the P2 425 may include required information of the sensor data. For example, the P1 423 may include the fixed value as shown in Table 16.

TABLE 16

| P1 | Description |
|---|---|
| 02h | fixed other value is not allowed |

For example, the P2 425 may include the sensor data-related information required by the first communication circuit 230, as shown in Table 17.

TABLE 17

| P2 | Description |
|---|---|
| 01h | Accelerometer |
| 02h | Gyroscope |
| 04h | Barometer |
| 08h | Magnetic |

According to an example embodiment, when the sensor data required by the distance measurement-related application program is "accelerometer" and "magnetic", the first communication circuit 230 may transmit a request signal of 01 A1 02 09 00 to the low-power processor 220. For example, "01" located at the front of the request signal may indicate the type 406 of the signal (e.g., packet) included in the payload 410, "A1" located after "01" may indicate the type CMD 421 of the sensor data-related request signal, "02" located after "A1" may indicate the P1 423 that requires a fixed value, "09" located after "02" may indicate the P2 425 that is the type of the sensor data required by the application program, and "00" located at the end may indicate the length 427 of the data. For example, the P2 425 may include a value of "09" based on the sum of "01h" of "accelerometer" and "08h" of "magnetic". According to various example embodiments, in operation 905, the low-power processor 220 may transmit the sensor data required by the first communication circuit 230 to the first communication circuit 230 in response to the request signal. According to an example embodiment, the low-power processor 220 may identify the sensor data required by the first communication circuit 230 based on the request signal. The low-power processor 220 may acquire the sensor data required by the first communication circuit 230 from the sensor module 250 and may transmit the acquired sensor data to the first communication circuit 230.

According to various example embodiments, in operation 907, the first communication circuit 230 may perform a ranging procedure based on the sensor data received from the low-power processor 220. According to an example embodiment, the first communication circuit 230 may transmit the ranging signal including the sensor data received from the low-power processor 220 to the external electronic device. According to an example embodiment, the first communication circuit 230 may identify (or estimate) the state of the electronic device 200 based on the sensor data received from the low-power processor 220. The first communication circuit 230 may adjust the distance measurement interval based on the state of the electronic device 200. According to an example embodiment, the first communication circuit 230 may transmit information related to a distance measurement interval (e.g., a period) adjusted based on the state of the electronic device 200 to the external electronic device. For example, the information related to the distance measurement interval (e.g., a period) may be included in a payload of a distance measurement message and may be transmitted. According to an example embodiment, the external electronic device may operate in a sleep state for a designated sleep time (e.g., during the distance measurement interval). For example, the external electronic device in the sleep state may stop receiving the signal from the electronic device 200 through the wireless communication module.

According to various example embodiments, in operation 909 or 915, the first communication circuit 230 may transmit the sensor data-related request signal to the low-power processor 220 at a time period when the sensor data is required. According to various example embodiments, in operation 911 or 917, the low-power processor 220 may transmit the sensor data required by the first communication circuit 230 to the first communication circuit 230 in response to the request signal.

According to various example embodiments, in operation 913 or 919, the first communication circuit 230 may update the distance measurement interval (e.g., a ranging interval) based on the sensor data received from the low-power processor 220. According to an example embodiment, the first communication circuit 230 may identify the state of the electronic device 200 based on the sensor data received from the low-power processor 220. The first communication circuit 230 may update the distance measurement interval based on the state of the electronic device 200. The first communication circuit 230 may perform ranging at the updated ranging interval.

According to various example embodiments, the first communication circuit 230 may perform the ranging procedure for measuring the distance between the electronic device 200 and the external electronic device based on the ranging instruction signal received from the processor 210. According to an example embodiment, when the ranging instruction signal is received from the processor 210, the first communication circuit 230 may perform the ranging procedure based on a designated distance measurement interval. For example, the designated distance measurement interval may include the previously used distance measurement interval or the default distance measurement interval configured in the electronic device 200.

Figure 10:
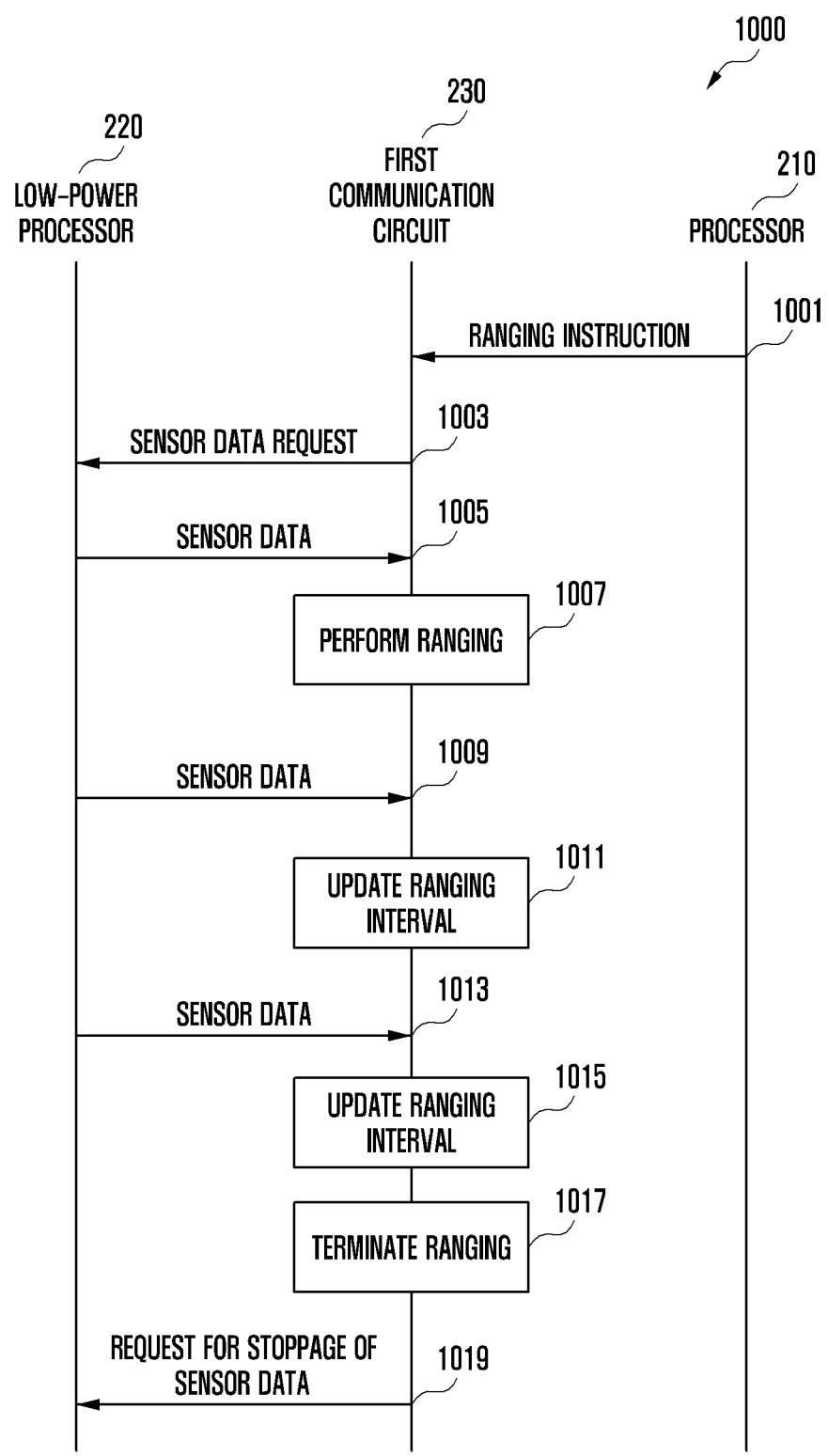
FIG. 10 is another example of a signal flow diagram illustrating a method of providing information related to a state of an electronic device in the electronic device according to various example embodiments.

FIG. 10 is another example of a signal flowchart illustrating a method of providing information related to the state of an electronic device in the electronic device according to various example embodiments.

Referring to FIG. 10, according to various example embodiments, the electronic device 200 may include the processor 210 (e.g., an application processor), the low-power processor 220 (e.g., a sensor hub processor), and/or the first communication circuit 230 (e.g., a UWB communication circuit).

According to various example embodiments, when the occurrence of a distance measurement event is detected, in operation 1001, the processor 210 may transmit a ranging instruction signal instructing the start of distance measurement to the first communication circuit 230. For example, the distance measurement event may occur when a distance measurement-related application program is executed or when a distance between the electronic device 200 and a destination (e.g., an external electronic device) measured through the second communication circuit 240 (e.g., Bluetooth) is within a designated first distance.

According to various example embodiments, in operation 1003, the first communication circuit 230 may transmit a sensor data-related request signal to the low-power processor 220 based on the ranging instruction signal. According to an example embodiment, the sensor data-related request signal may include information related to a transmission period of the sensor data and/or a designated condition related to the transmission of the sensor data. For example, the payload 410 of the request signal related to periodic sensor data may include a type CMD 421 of the request signal, a P1 423, a P2 425, a length 427 of data, and/or data 429. For example, as shown in Table 18, the type CMD 421 of the request signal may indicate that the payload of the signal is the request signal related to periodic sensor data. For example, as shown in Table 16, the P1 423 may include a fixed value. For example, as shown in Table 17, the P2 425 may include information related to the sensor data required by the first communication circuit 230.

TABLE 18

| CMD | Description |
| --- | --- |
| A2h | request for periodic sensor data |

According to an example embodiment, when the sensor data required by the application program is "accelerometer" and "magnetic", the first communication circuit 230 may transmit a request signal related to periodic sensor data of 01 A2 02 09 02 00 64 to the low-power processor 220. For example, "01" located at the front of the request signal may indicate the type 406 of the signal (e.g., a packet) included in the payload 410, "A2" located after "01" may indicate the type CMD 421 of the request signal related to periodic sensor data, "02" located after "A2" may indicate the P1 423 that requires a fixed value, "09" located after "02" may indicate the P2 425 which is the type of the sensor data required by the application program, "02" located after "09" may indicate the length 427 of 2 byte-data, and "00 64" located at the end may indicate the data 429 that is a transmission period (e.g., about 100 ms) in which the first communication circuit 230 requires the sensor data. For example, the P2 425 may include a value of "09" based on the sum of "01h" of "accelerometer" and "08h" of "magnetic". According to various example embodiments, in operation 1005, the low-power processor 220 may transmit the sensor data required by the first communication circuit 230 to the first communication circuit 230 in response to the request signal. According to an example embodiment, the low-power processor 220 may identify the sensor data and the transmission period required by the first communication circuit 230 based on the request signal. The low-power processor 220 may acquire the sensor data required by the first communication circuit 230 from the sensor module 250 and transmit the acquired sensor data to the first communication circuit 230.

According to various example embodiments, in operation 1007, the first communication circuit 230 may perform a ranging procedure based on the sensor data received from the low-power processor 220. According to an example embodiment, the first communication circuit 230 may add the sensor data received from the low-power processor 220 to the ranging signal and may transmit the resultant data to the external electronic device. For example, the external electronic device may identify the state of the electronic device 200 based on the sensor data received from the electronic device 200, and may predict a change in the reception interval of the distance measurement-related data received from the electronic device 200. According to an example embodiment, the first communication circuit 230 may identify (or estimate) the state of the electronic device 200 based on the sensor data received from the low-power processor 220. The first communication circuit 230 may adjust the distance measurement interval based on the state of the electronic device 200.

According to various example embodiments, in operation 1009 or 1013, the low-power processor 220 may transmit the sensor data required by the first communication processor 230 to the first communication circuit 230. According to an example embodiment, the low-power processor 220 may periodically transmit the sensor data required by the first communication circuit 230 to the first communication circuit 230. According to an example embodiment, when the sensor data received from the sensor module 250 satisfies a designated condition, the low-power processor 220 may transmit the sensor data required by the first communication circuit 230 to the first communication circuit 230.

According to various example embodiments, in operation 1011 or 1015, the first communication circuit 230 may determine the state of the electronic device 200 based on the sensor data received from the low-power processor 220, and may update (or adjust) the distance measurement interval (e.g., the ranging interval) based on the determination result.

According to various example embodiments, in operation 1017, the first communication circuit 230 may end the ranging procedure. According to an example embodiment, the first communication circuit 230 may end the ranging procedure based on a signal related to the end of the distance measurement received from the processor 210. According to an example embodiment, when the execution of the distance measurement-related application program is terminated, when the distance between the electronic device 200 and the external electronic device identified through the second communication circuit 240 exceeds a designated first distance, when the strength (e.g., RSSI) of the signal transmitted and received to and from the external electronic device through the second communication circuit 240 is smaller than or equal to a designated threshold value, or when it is recognized that the strength (e.g., RSSI) of the signal transmitted and received to and from the external electronic device through the second communication circuit 240 decreases, the processor 210 may transmit the signal related to the end of distance measurement to the first communication circuit 230 based on the determination to terminate distance measurement.

According to various example embodiments, in operation 1019, the first communication circuit 230 may transmit a request signal related to stoppage of the transmission of the sensor data to the low-power processor 220 based on the type of the ranging procedure. According to an example embodiment, the low-power processor 220 may terminate the transmission of the sensor data to the first communication circuit 230 based on the request signal related to the stoppage of the transmission of the sensor data.

Figure 11:
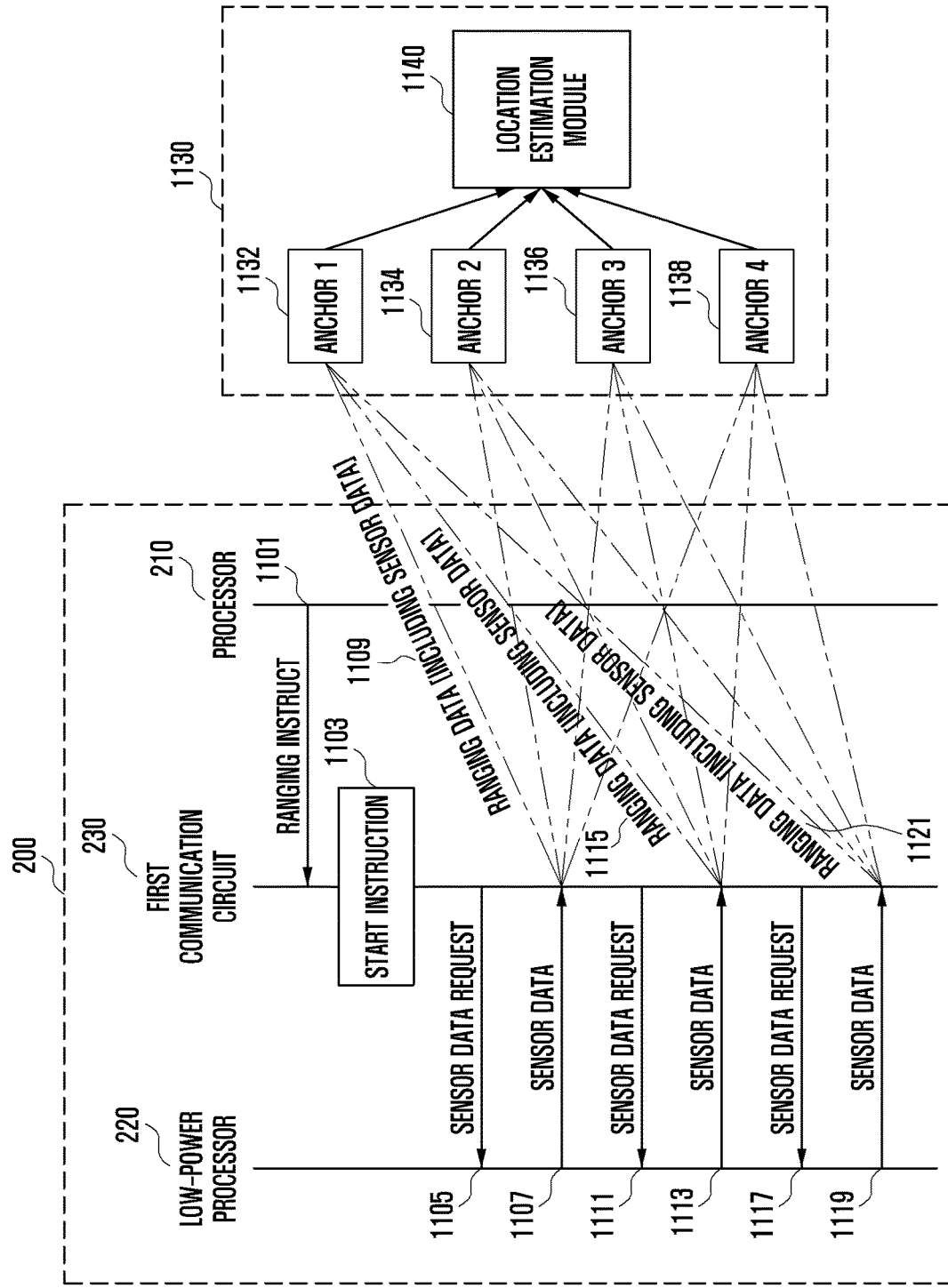
FIG. 11 is a signal flow diagram illustrating a method of measuring a position of an electronic device using an external device according to various example embodiments.

FIG. 11 is a signal flowchart illustrating a method of measuring a position of an electronic device using an external device according to various example embodiments.

Referring to FIG. 11, according to various example embodiments, the electronic device 200 may include the processor 210 (e.g., an application processor), the low-power processor 220 (e.g., a sensor hub processor), and/or the first communication circuit 230 (e.g., a UWB communication circuit).

According to various example embodiments, when the occurrence of a distance measurement event is detected, in operation 1101, the processor 210 may transmit a ranging instruction signal instructing the start of distance measurement to the first communication circuit 230. For example, the processor 210 may transmit the ranging instruction signal and may then be switched to a sleep state, an idle state, or a low-power state.

According to various example embodiments, in operation 1103, the first communication circuit 230 may perform a ranging procedure for measuring a distance between the electronic device 200 and an external electronic device based on the reception of the ranging instruction signal. According to an example embodiment, when distance measurement-related configuration information is not included in the ranging instruction signal, the first communication circuit 230 may perform the ranging procedure at a designated ranging interval. For example, the designated distance measurement interval may include the previously used distance measurement interval or a default distance measurement interval configured in the electronic device 200.

According to various example embodiments, in operation 1105, the first communication circuit 230 may transmit a sensor data-related request signal to the low-power processor 220. For example, the sensor data-related request signal may include state information of the electronic device 200 required by the first communication circuit 230 and/or type information of the sensor module 250.

According to various example embodiments, in operation 1107, the low-power processor 220 may transmit sensor data required by the first communication circuit 230 to the first communication circuit 230 in response to the request signal. According to an example embodiment, the first communication circuit 230 may determine the orientation of the electronic device 200 based on the sensor data received from the low-power processor 220, and the determined direction may be used for acquiring AoA (e.g., azimuth/elevation) with an external electronic device 1130. According to an example embodiment, the first communication circuit 230 may transmit the received sensor data to the external electronic device 1130, so that the received sensor data may be utilized for the external electronic device 1130 to determine the position of the electronic device 200. For example, the external electronic device 1130 may estimate a 3D (e.g., X-, Y-, and Z-axis) position of the electronic device 200 based on barometer sensor information received from the electronic device 200.

According to various example embodiments, in operation 1109, the first communication circuit 230 may transmit the ranging signal including the sensor data received from the low-power processor 220 to the external electronic device 1130. According to an example embodiment, the external electronic device 1130 may include a plurality of anchors (e.g., anchor #1 1132, anchor #2 1134, anchor #3 1136, and/or anchor #4 1138) and a location estimation module 1140. According to an example embodiment, the first communication circuit 230 may transmit the ranging signal including the sensor data to anchor #1 1132, anchor #2 1134, anchor #3 1136, and/or anchor #4 1138 included in the external electronic device 1130. For example, the first communication circuit 230 may broadcast the ranging signal including the sensor data to the vicinity of the first communication circuit 230. For example, anchor #1 1132, anchor #2 1134, anchor #3 1136, and/or anchor #4 1138 included in the external electronic device 1130 may receive the ranging signal broadcasted by the first communication circuit 230. For example, the first communication circuit 230 may transmit the ranging signal including the sensor data to each of anchor #1 1132, anchor #2 1134, anchor #3 1136, and/or anchor #4 1138 included in the external electronic device 1130.

According to various example embodiments, the external electronic device 1130 may estimate the location of the electronic device 200 based on the sensor data included in the ranging signal. According to an example embodiment, the location estimation module 1140 of the external electronic device 1130 may estimate height information (e.g., a floor on which the electronic device 200 is located in a building) of the electronic device 200 based on the sensor data (e.g., biometric pressure information) of the electronic device 200 provided from anchor #1 1132, anchor #2 1134, anchor #3 1136, and/or anchor #4 1138.

According to various example embodiments, in operation 1111 or 1117, the first communication circuit 230 may transmit the sensor data-related request signal to the low-power processor 220 at a time point when the sensor data is required. According to various example embodiments, in operation 1113 or 1119, the low-power processor 220 may transmit the sensor data required by the first communication circuit 230 to the first communication circuit 230 in response to the request signal.

According to various example embodiments, in operation 1115 or 1121, the first communication circuit 230 may transmit the ranging signal including the sensor data received from the low-power processor 220 to the external electronic device 1130.

According to various example embodiments, when the distance measurement-related configuration information is included in the ranging instruction signal, the first communication circuit 230 may perform the ranging procedure based on the sensor data received from the low-power processor 220 (e.g., omit operation 1103). According to an example embodiment, in operation 1107, 1113, or 1119, the first communication circuit 230 may determine the state of the electronic device 200 based on the sensor data received from the low-power processor 220. The first communication circuit 230 may perform ranging based on the distance measurement interval (e.g., a ranging interval) determined based on the state of the electronic device 200.

Figure 12:
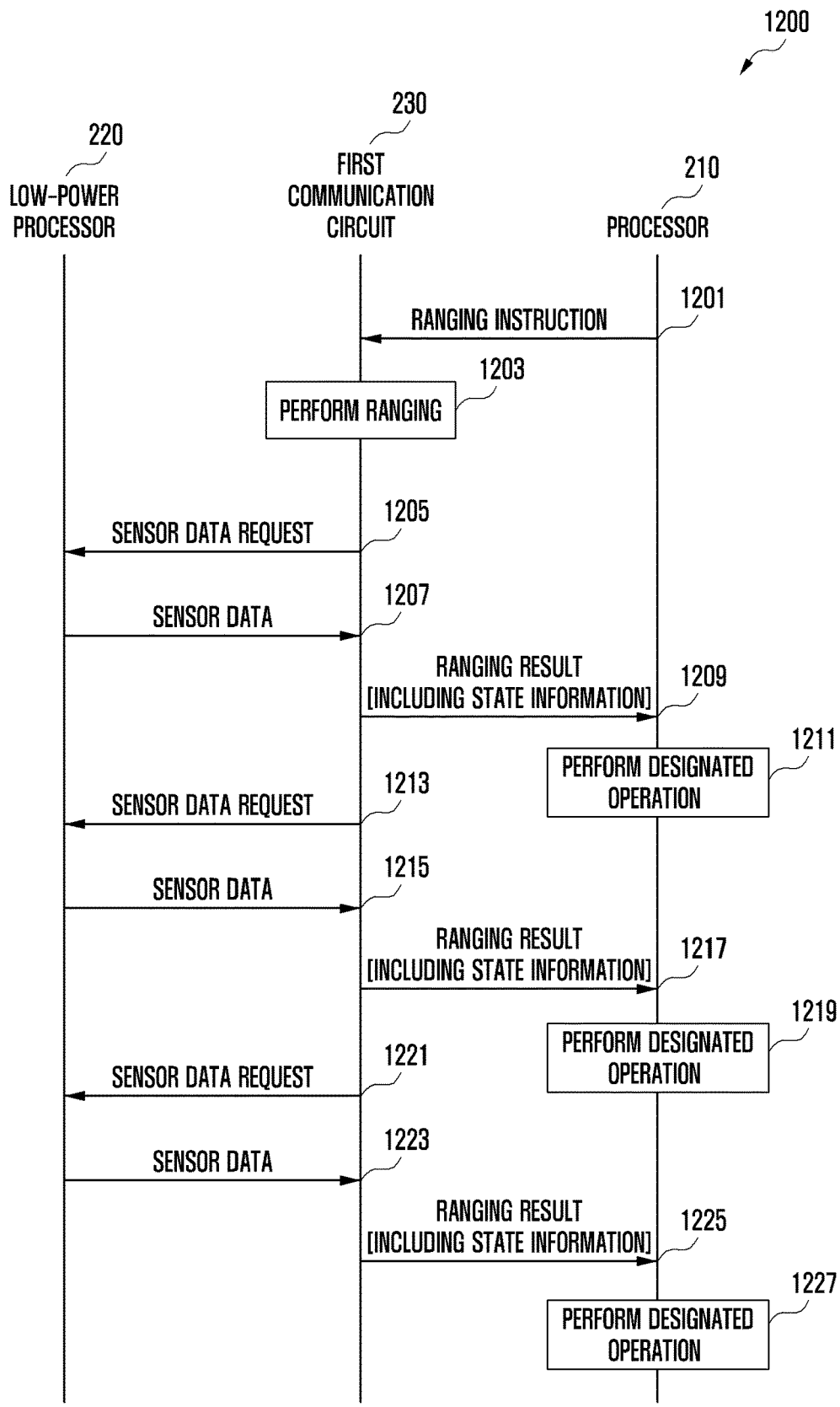
FIG. 12 is a signal flow diagram illustrating a method of providing a ranging result in an electronic device according to various example embodiments.

FIG. 12 is a signal flowchart illustrating a method of providing a ranging result in an electronic device according to various example embodiments.

Referring to FIG. 12, according to various example embodiments, the electronic device 200 may include the processor 210 (e.g., an application processor), the low-power processor 220 (e.g., a sensor hub processor), and/or the first communication circuit 230 (e.g., a UWB communication circuit).

According to various example embodiments, when the occurrence of a distance measurement event is detected, in operation 1201, the processor 210 may transmit a ranging instruction signal instructing the start of distance measurement to the first communication circuit 230.

According to various example embodiments, in operation 1203, the first communication circuit 230 may perform a ranging procedure for measuring a distance between the electronic device 200 and an external electronic device based on the reception of the ranging instruction signal. According to an example embodiment, when distance measurement-related configuration information is not included in the ranging instruction signal, the first communication circuit 230 may perform the ranging procedure at a designated ranging interval. For example, the designated distance measurement interval may include the previously used distance measurement interval or a default distance measurement interval configured in the electronic device 200.

According to various example embodiments, in operation 1205, the first communication circuit 230 may transmit a request signal related to sensor data required by the processor 210 to the low-power processor 220.

According to various example embodiments, in operation 1207, the low-power processor 220 may transmit the sensor data required by the processor 210 to the first communication circuit 230 in response to the request signal.

According to various example embodiments, in operation 1209, the first communication circuit 230 may transmit a signal including a ranging result obtained by performing ranging based on the sensor data received from the low-power processor 220, to the processor 210. According to an example embodiment, the first communication circuit 230 may transmit the ranging result and the signal including the sensor data (or state information of the electronic device 200) received from the low-power processor 220, to the processor 210. For example, when the ranging result and/or the sensor data (or state information of the electronic device 200) received from the low-power processor 220 satisfies a designated condition, the first communication circuit 230 may transmit the ranging result and the signal including the sensor data (or the state information of the electronic device 200) received from the low-power processor 220 to the processor 210. For example, the designated condition may include information indicating whether the distance between the electronic device 200 and the external electronic device is within a designated distance based on the ranging result.

According to various example embodiments, in operation 1211, the processor 210 may perform a designated operation based on the signal received from the first communication circuit 230. According to an example embodiment, when the processor 210 is switched to a sleep state, the processor may be periodically enabled to determine whether the signal is received from the first communication circuit 230. When the signal is received from the first communication circuit 230, the processor 210 may be switched to an enabled state to perform a designated operation based on the signal received from the first communication circuit 230. According to an example embodiment, when the external electronic device is a door lock, the processor 210 may perform an operation of requesting unlocking of the external electronic device based on a determination that the electronic device 200 and the external electronic device are close to each other within a designated distance based on the signal received from the first communication circuit 230. According to an example embodiment, when the external electronic device is a door lock, the processor 210 may perform an operation of requesting to lock the external electronic device based on a determination that the electronic device 200 and the external electronic device are separated from each other by a designated distance or more based on the signal received from the first communication circuit 230. According to an example embodiment, when the external electronic device is a vehicle, the processor 210 may perform an operation of requesting to open the door of the vehicle or to start the engine of the vehicle based on a determination that the electronic device 200 and the external electronic device are close to each other within the designated distance based on the signal received from the first communication circuit 230. According to an example embodiment, when the external electronic device is a vehicle, the processor 210 may perform an operation of requesting to lock the door of the vehicle or to turn off the engine of the vehicle based on a determination that the electronic device 200 and the external electronic device are separated from each other by the designated distance or more based on the signal received from the first communication circuit 230.

According to various example embodiments, in operation 1213 or 1221, the processor 210 may transmit the sensor data-related request signal to the low-power processor 220 at a time point when the sensor data is required. According to various example embodiments, in operation 1215 or 1223, the low-power processor 220 may transmit the sensor data required by the processor 210 to the first communication circuit 230 in response to the request signal.

According to various example embodiments, in operation 1217 or 1225, the first communication circuit 230 may transmit a signal including the ranging result obtained by performing ranging based on the sensor data received from the low-power processor 220, to the processor 210. For example, the first communication circuit 230 may transmit the ranging result and the signal including the received sensor data (or the state information of the electronic device 200) to the processor 210.

According to various example embodiments, in operation 1219 or 1227, the processor 210 may perform a designated operation based on the signal received from the first communication circuit 230.

According to various example embodiments, when the distance measurement-related configuration information is included in the ranging instruction signal, the first communication circuit 230 may perform the ranging procedure based on the sensor data received from the low-power processor 220 (e.g., omit operation 1203). According to an example embodiment, in operation 1207, 1215, or 1223, the first communication circuit 230 may determine the state of the electronic device 200 based on the sensor data received from the low-power processor 220. The first communication circuit 230 may perform ranging based on the distance measurement interval (e.g., a ranging interval) determined based on the state of the electronic device 200.

According to an example embodiment of the disclosure, the is provided an electronic device including: one or more memories configured to store one or more instructions; and one or more processors configured to execute the one or more instructions to: receive sensor data from one or more sensors corresponding to the electronic device; identifying a state of the electronic device based on the sensor data; measure a distance to an external electronic device based on the state of the electronic device.

The one or more processors are further configured to identify whether the electronic device is in a state of movement.

The electronic device may include the one or more sensors.

The one or more processors may include: a first processor configured to receive the sensor data from the one or more sensors; and a second processor configured to control the measurement of the distance to the external electronic device based on the state of the electronic device, wherein the first processor is configured to operate at a lower power than the second processor.

Figure 13A:
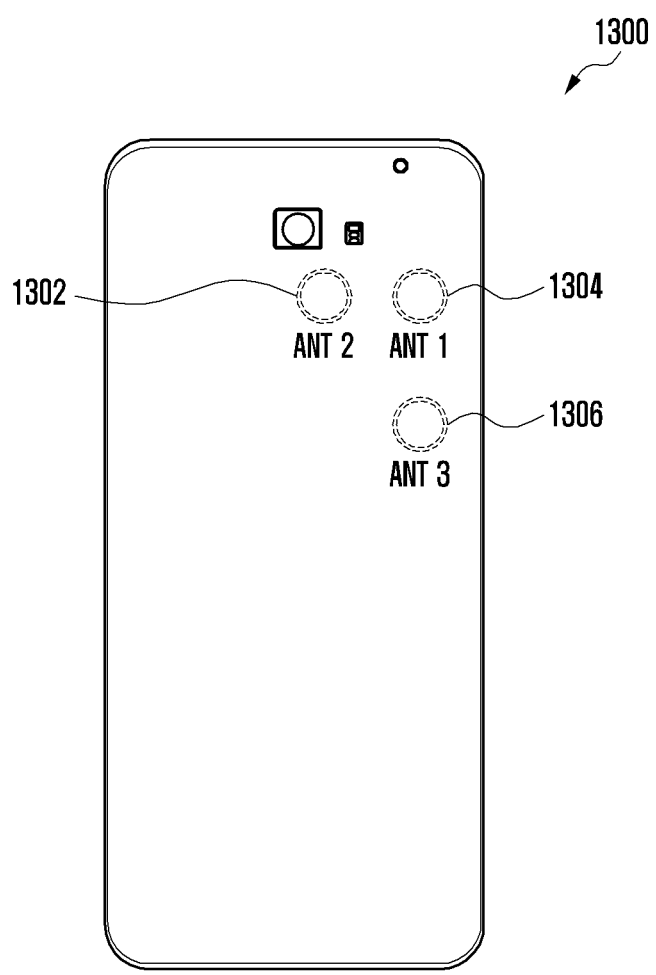
FIGS. 13A and 13B are diagrams illustrating a configuration for selecting an antenna based on a direction of an electronic device according to various example embodiments.
Figure 13B:
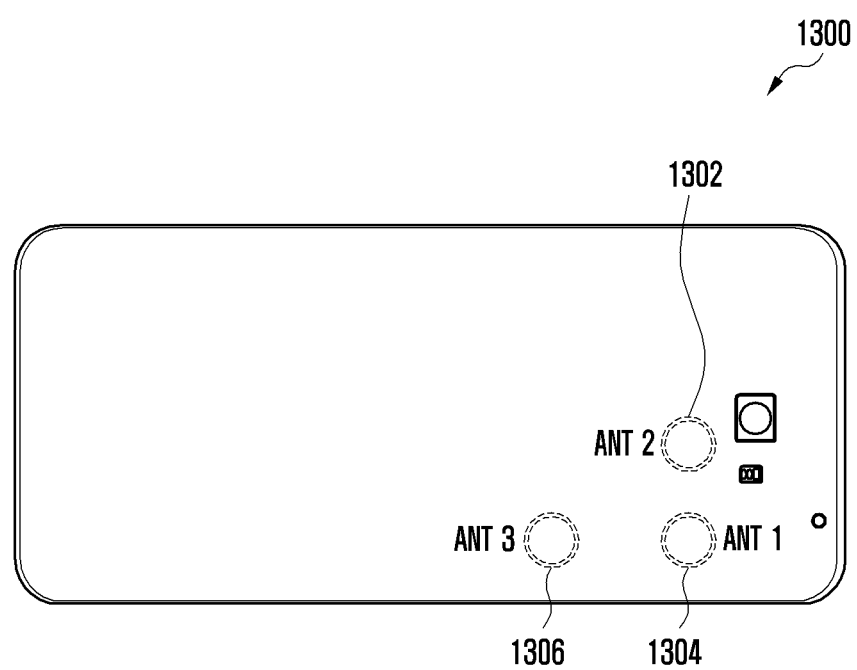

FIGS. 13A and 13B are diagrams illustrating a configuration for selecting an antenna based on a direction of an electronic device according to various example embodiments.

Referring to FIGS. 13A and 13B, the electronic device 200 may include a first antenna 1302, a second antenna 1304, and/or a third antenna 1306 for use in transmission and/or reception of data through the first communication circuit 230. According to an example embodiment, when two reception ports are used, the first communication circuit 230 may transmit and/or receive a ranging signal by using two antennas of the first antenna 1302, the second antenna 1304, and the third antenna 1306.

According to various example embodiments, the first communication circuit 230 may select antennas to be used for ranging based on the orientation of the electronic device 200. According to an example embodiment, the first communication circuit 230 may identify the direction of the electronic device 200 based on sensor data provided from the low-power processor 220. For example, when the electronic device 200 is in a vertical direction as shown in FIG. 13A, the first communication circuit 230 may transmit and/or receive the ranging signal using the first antenna 1302 and the second antenna 1304. For example, when the electronic device 200 is in a horizontal direction as shown in FIG. 13B, the first communication circuit 230 may transmit and/or receive the ranging signal using the first antenna 1302 and the third antenna 1306. For example, the first communication circuit 230 (or the processor 210) may acquire AoA (e.g., azimuth/elevation) based on a ranging response signal received through two antennas.

According to various example embodiments, a method of operating an electronic device (e.g., the electronic device 101 of FIG. 1 or the electronic device 200 of FIG. 2) may include transmitting, by a first communication circuit (e.g., the wireless communication module 192 of FIG. 1 or the first communication circuit 230 of FIG. 2) supporting a first communication scheme, a request signal related to a state of the electronic device to a low-power processor (e.g., the auxiliary processor 123 of FIG. 1 or the low-power processor 220 of FIG. 2), receiving information related to the state of the electronic device from the low-power processor in response to the request signal, configuring a distance measurement interval as a first interval based on the information related to the state of the electronic device, and transmitting a signal for distance measurement to an external electronic device based on the first interval.

According to various example embodiments, the method may further include, when information related to a change in the state of the electronic device is received from the low-power processor, configuring the distance measurement interval as a second interval different from the first interval based on the information related to the change in the state of the electronic device, and transmitting the signal for distance measurement to the external electronic device based on the second interval.

According to various example embodiments, the receiving of the information related to the state of the electronic device may include identifying, by the low-power processor, sensor data detected through a sensor module of the electronic device based on the request signal related to the state of the electronic device, identifying, by the low-power processor, the state of the electronic device based on the sensor data, and transmitting, by the low-power processor, the information related to the state of the electronic device to the first communication circuit based on the identification result.

According to various example embodiments, the method may further include identifying, by a processor (e.g., the main processor 120 of FIG. 1 or the processor 210 of FIG. 2) of the electronic device, a distance to the external electronic device through a second communication circuit (e.g., the wireless communication module 192 of FIG. 1 or the second communication circuit 240 of FIG. 2) supporting a second communication scheme, and transmitting, when the distance to the external electronic device satisfies a designated first reference, distance measurement-related information to the first communication circuit. The transmitting to the low-power processor may include transmitting, by the first communication circuit, the request signal related to the state of the electronic device to the low-power processor based on the distance measurement-related information provided from the processor.

According to various example embodiments, the processor may transmit the distance measurement-related information to the first communication circuit, and may then be switched to a sleep state, an idle state, or a low-power state.

According to various example embodiments, the first communication scheme may support an ultra-wideband (UWB) communication scheme, and the second communication scheme may support one of Bluetooth, Bluetooth low energy (BLE), wireless fidelity (Wi-Fi), a global navigation satellite system (GNSS), or a cellular (e.g., long-term evolution (LTE) or new radio (NR)) communication scheme.

The embodiments of the disclosure of the present specification and drawings are only presented as specific examples to easily explain the technical content according to the embodiment of the disclosure and to help the understanding of the embodiments of the disclosure, and are not intended to limit the scope of the embodiments of the disclosure. Therefore, in the scope of various example embodiments of the disclosure, in addition to the embodiments disclosed herein, all changes or modifications derived from the technical ideas of various example embodiments of the disclosure should be interpreted as being included in the scope of various example embodiments of the disclosure.

What is claimed is:

1. An electronic device comprising:
one or more sensors;
a first communication circuitry;
a first processor configured to acquire a movement state of the electronic device based on sensor data acquired via the one or more sensors; and
a second processor configured to be operatively connected to the one or more sensors, the first communication circuitry, and the first processor,
wherein the first communication circuitry is configured to:
in response to receiving, from the second processor, first information related to a distance measurement, switch from a sleep state to an enabled state;
acquire, from the first processor, second information related to the movement state of the electronic device based on the switch to the enabled state;
configure a distance measurement interval as a first interval based on the acquired second information; and
measure a distance to an external electronic device based on the first interval.

2. The electronic device of claim 1, wherein the first communication circuitry is further configured to:
transmit, to the external electronic device, a distance measurement signal based on the first interval,
receive, the external electronic device, a response message to the distance measurement signal, and
estimate the distance between the electronic device and the external electronic device based on a transmission time point of the distance measurement signal and a reception time point of the response message.

3. The electronic device of claim 2, wherein the first communication circuitry is further configured to:
receive, from the first processor, information relating to a change in the movement state of the electronic device;
change the distance measurement interval to a second interval different from the first interval based on the received information relating to the change in the movement state of the electronic device;
transmit, to the external electronic device, the distance measurement signal based on the second interval;
receive, from the external electronic device, a response message to the distance measurement signal, and
estimate the distance between the electronic device and the external electronic device based on a transmission time point of the distance measurement signal and a reception time point of the response message.

4. The electronic device of claim 1, wherein the first processor is configured to:
identify, via the one or more sensors, the sensor data detected based on a request signal related to the movement state of the electronic device received from the first communication circuitry;
identify the movement state of the electronic device based on the sensor data; and
transmit, to the first communication circuitry, the second information related to the movement state of the electronic device based on a result of identifying the movement state.

5. The electronic device of claim 1, wherein the one or more sensors comprises at least one of an accelerometer sensor, a gyro sensor, a barometer sensor, or a magnetic sensor.

6. The electronic device of claim 1, further comprising a second communication circuitry configured to support a second communication scheme that is different from a first communication scheme supported by the first communication circuitry,
wherein the second processor is configured to:
identify, via the second communication circuitry, the distance to the external electronic device; and
in case that the distance to the external electronic device satisfies a first reference value, transmit the first information to the first communication circuitry.

7. The electronic device of claim 6, wherein the first communication scheme comprises an ultra-wideband (UWB) communication scheme, and the second communication scheme comprises one of Bluetooth, Bluetooth low energy (BLE), wireless fidelity (Wi-Fi), a global navigation satellite system (GNSS), a cellular communication scheme, a long-term evolution (LTE) or new radio (NR).

8. The electronic device of claim 1, wherein the second processor is configured to be switched to a sleep state, an idle state, or a low-power state while the first communication circuitry measures the distance to the external electronic device.

9. The electronic device of claim 1, wherein the first processor is configured to operate at a lower power than the second processor.

10. The electronic device of claim 1, wherein the first communication circuitry is further configured to:
in response to receiving the first information related to the distance measurement from the second processor, switch to the enabled state;
transmit, to the first processor, the first information related to the distance measurement based on the switch to the enabled state;
switch from the enabled state to the sleep state based on a response signal to the first information received from the first processor.

11. The electronic device of claim 10, wherein the first communication circuitry is enabled at a designated period to receive a signal from the first processor during the sleep state.

12. The electronic device of claim 10, wherein the first communication circuitry is further configured to:
receive an enabling indication signal from the first processor, and
switch to an enabled state based on the enabling indication signal.

13. The electronic device of claim 1, wherein the first communication circuitry is configured to transmit a ranging result signal to the second processor, the ranging result signal comprises a ranging result obtained by performing a ranging operation based on the second information from the first processor.

14. A method of operating an electronic device, the method comprising:
in response to receiving first information related to a distance measurement from a second processor of the electronic device, switching a first communication circuitry of the electronic device from a sleep state to an enabled state;
acquiring, by the first communication circuitry in the enabled state, second information related to a movement state of the electronic device from a first processor of the electronic device;
configuring, by the first communication circuitry in the enabled state, a first interval, as a distance measurement interval, based on the second information related to the movement state of the electronic device;
performing a ranging operation, by the first communication circuitry in the enabled state, to measure a distance to an external electronic device based on the first interval.

15. The method of claim 14, further comprising:
changing, based on information relating to a change in the movement state of the electronic device being received from the first processor, the distance measurement interval to a second interval different from the first interval;
transmitting, to the external electronic device, a distance measurement signal based on the second interval;
receiving, from the external electronic device, a response message to the distance measurement signal, and
estimating the distance between the electronic device and the external electronic device based on a transmission time point of the distance measurement signal and a reception time point of the response message.

16. The method of claim 14, further comprising:
identifying, by the first processor, sensor data detected through one or more sensors of the electronic device based on a request signal related to the movement state of the electronic device received from the first communication circuitry;
identifying, by the first processor, the movement state of the electronic device based on the sensor data; and
transmitting, by the first processor, the second information related to the movement state of the electronic device to the first communication circuitry based on a result of identifying the movement state.

17. The method of claim 14, further comprising:
identifying, by the second processor, the distance to the external electronic device through a second communication circuitry supporting a second communication scheme that is different from a first communication scheme supported by the first communication circuitry; and
transmitting, by the second processor, the first information to the first communication circuitry in case that the distance to the external electronic device satisfies a designated first reference value.

18. The method of claim 17, wherein the second processor is configured to be switched to a sleep state, an idle state, or a low-power state after transmitting the first information to the first communication circuitry.

19. The method of claim 17, wherein the first communication scheme comprises an ultra-wideband (UWB) communication scheme, and the second communication scheme comprises one of Bluetooth, Bluetooth low energy (BLE), wireless fidelity (Wi-Fi), a global navigation satellite system (GNSS), or a cellular communication scheme, a long-term evolution (LTE) or new radio (NR).

* * * * *